United States Patent [19]

Yamaguchi et al.

[11] Patent Number: 5,732,051
[45] Date of Patent: Mar. 24, 1998

[54] FOCUSING CONTROL APPARATUS USING DYNAMIC TARGET VALUE IN RELATION TO LAND/GROOVE

[75] Inventors: Hiroyuki Yamaguchi, Hirakata; Mitsuro Moriya, Ikoma; Osamu Yamaguchi, Hirakata; Shin-ichi Yamada, Katano; Toshiyuki Kinou, Kofu; Yoshihiro Kanda, Osaka, all of Japan

[73] Assignee: Matsushita Electric Industrial Co., Ltd., Kadoma, Japan

[21] Appl. No.: 413,489

[22] Filed: Mar. 30, 1995

[30] Foreign Application Priority Data

Apr. 1, 1994 [JP] Japan ..................... 6-064281

[51] Int. Cl.$^6$ ........................................ G11B 7/00
[52] U.S. Cl. ........................ 369/44.25; 369/44.26; 369/44.29; 369/44.35
[58] Field of Search ................. 369/44.25, 44.36, 369/44.26, 44.29, 44.11, 44.35, 44.27, 43, 54, 58; 250/201.5

[56] References Cited

U.S. PATENT DOCUMENTS 5,138,594  8/1992  Fennema ................. 369/44.29

FOREIGN PATENT DOCUMENTS 3130937  6/1991  Japan.
438633   2/1992  Japan.

OTHER PUBLICATIONS

Abstract for Japanese Pat. No. 3-130937, Jun. 4, 1991.

Abstract for Japanese Pat. No. 4-38633, Feb. 7, 1992.

Primary Examiner—Aristotelis M. Psitos
Assistant Examiner—Alan Faber
Attorney, Agent, or Firm—Renner, Otto, Boiselle & Sklar, P.L.L.

[57] ABSTRACT

A focusing control apparatus is provided for controlling focusing of a light beam on a recording medium. The apparatus includes a control mechanism for maintaining the focusing state of the light beam on the recording medium by moving a focus mechanism based on a comparison between an output signal indicative of the focusing state and a target value. The apparatus further includes a target value setting circuit for setting the target value at a first level when the light beam is irradiated on the land track portions of the recording medium; and for setting the target value at a second level when the light beam is irradiated on the groove track portions.

15 Claims, 20 Drawing Sheets

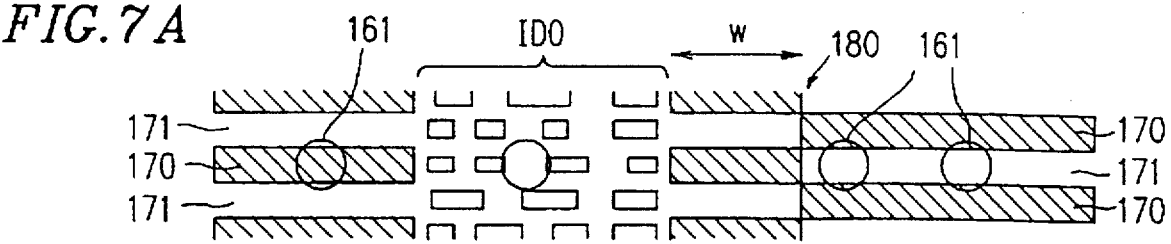
FIG. 7A
FIG. 7B DET
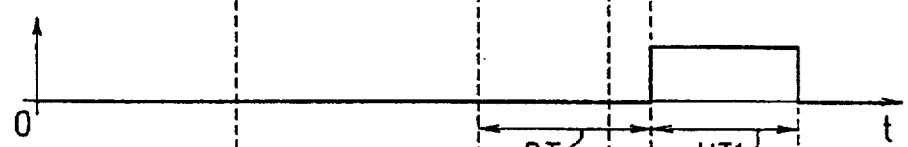
FIG. 7C SH20
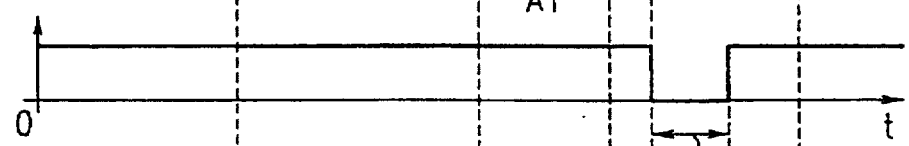
FIG. 7D SH27
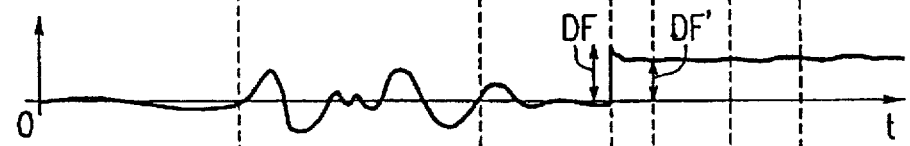
FIG. 7E ER
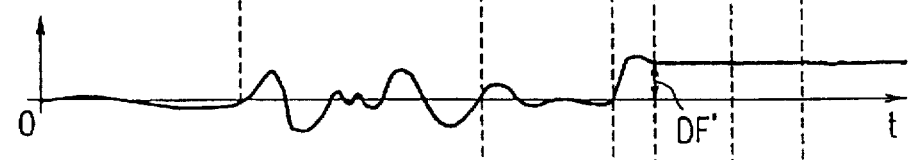
FIG. 7F OUT20
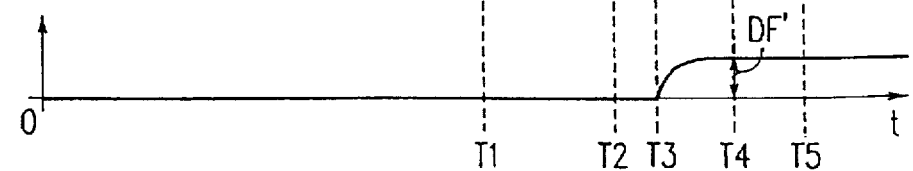
FIG. 7G OUT27

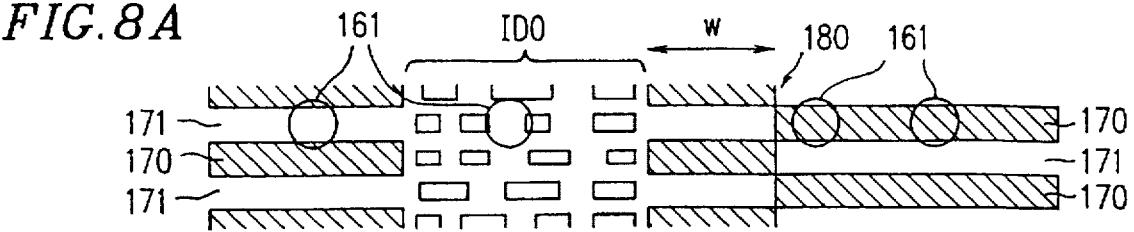
FIG. 8A
FIG. 8B DET
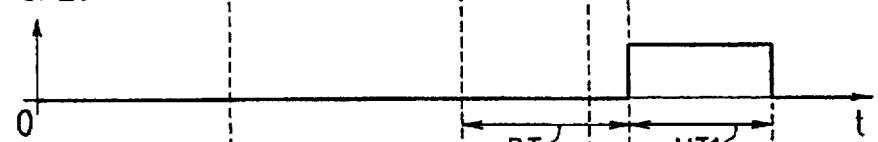
FIG. 8C SH20
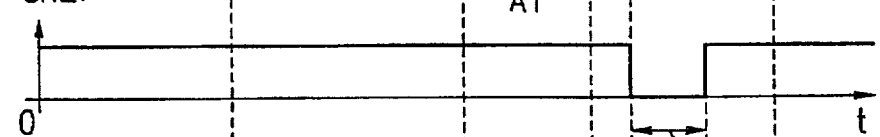
FIG. 8D SH27
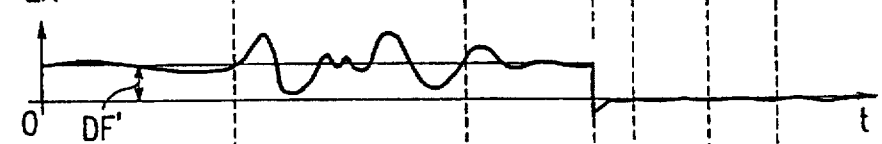
FIG. 8E ER
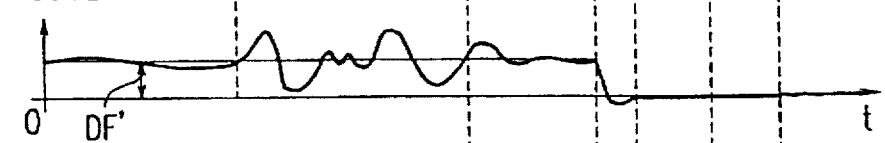
FIG. 8F OUT20
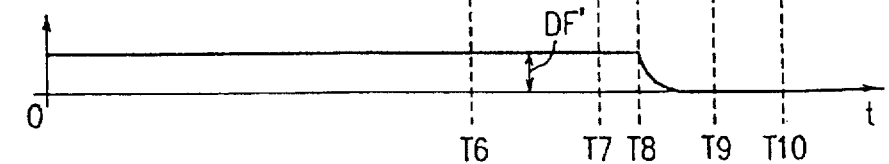
FIG. 8G OUT27

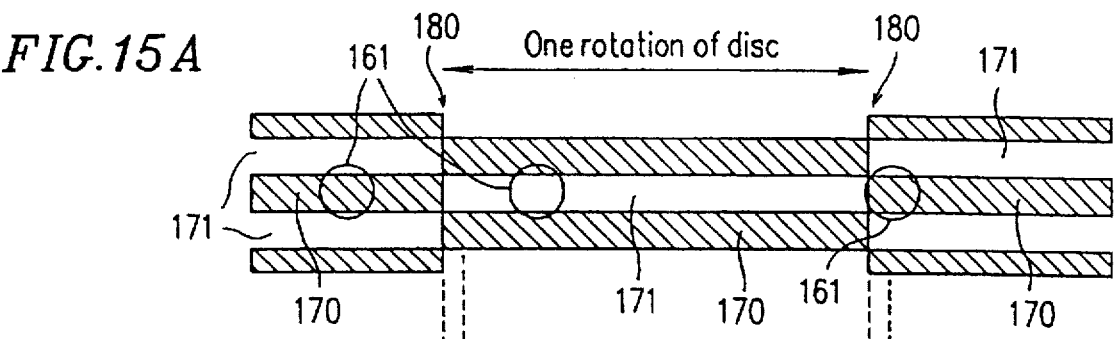
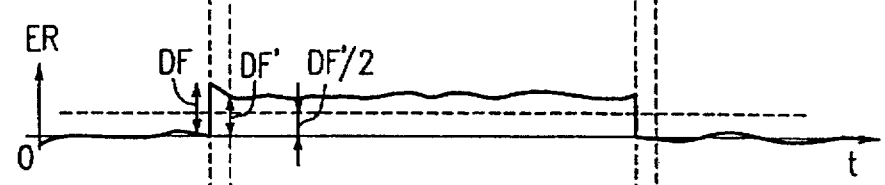
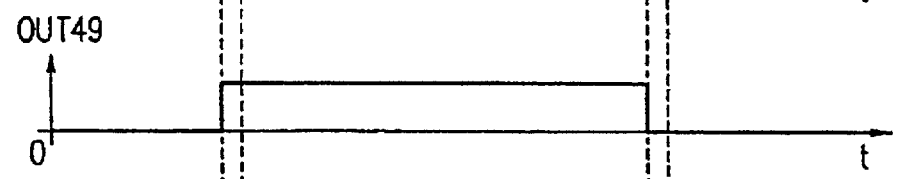
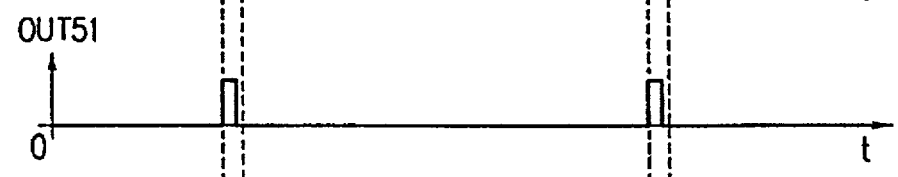
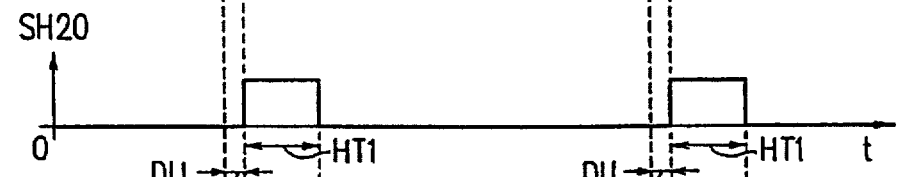
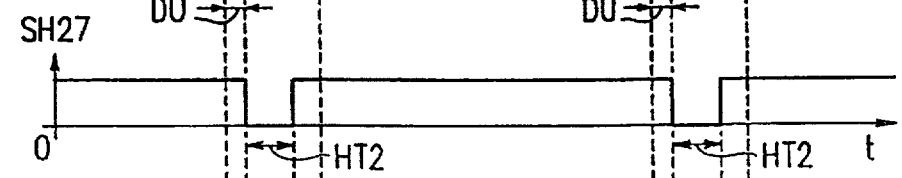
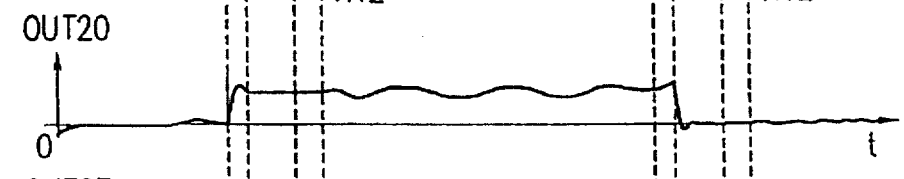
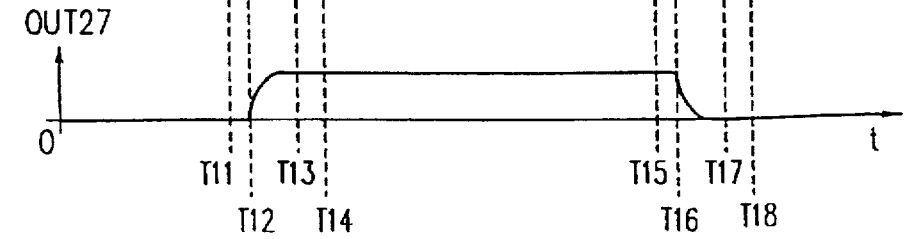

Far away from disc

In focus

Close to disc

Radial direction

Circumferential direction

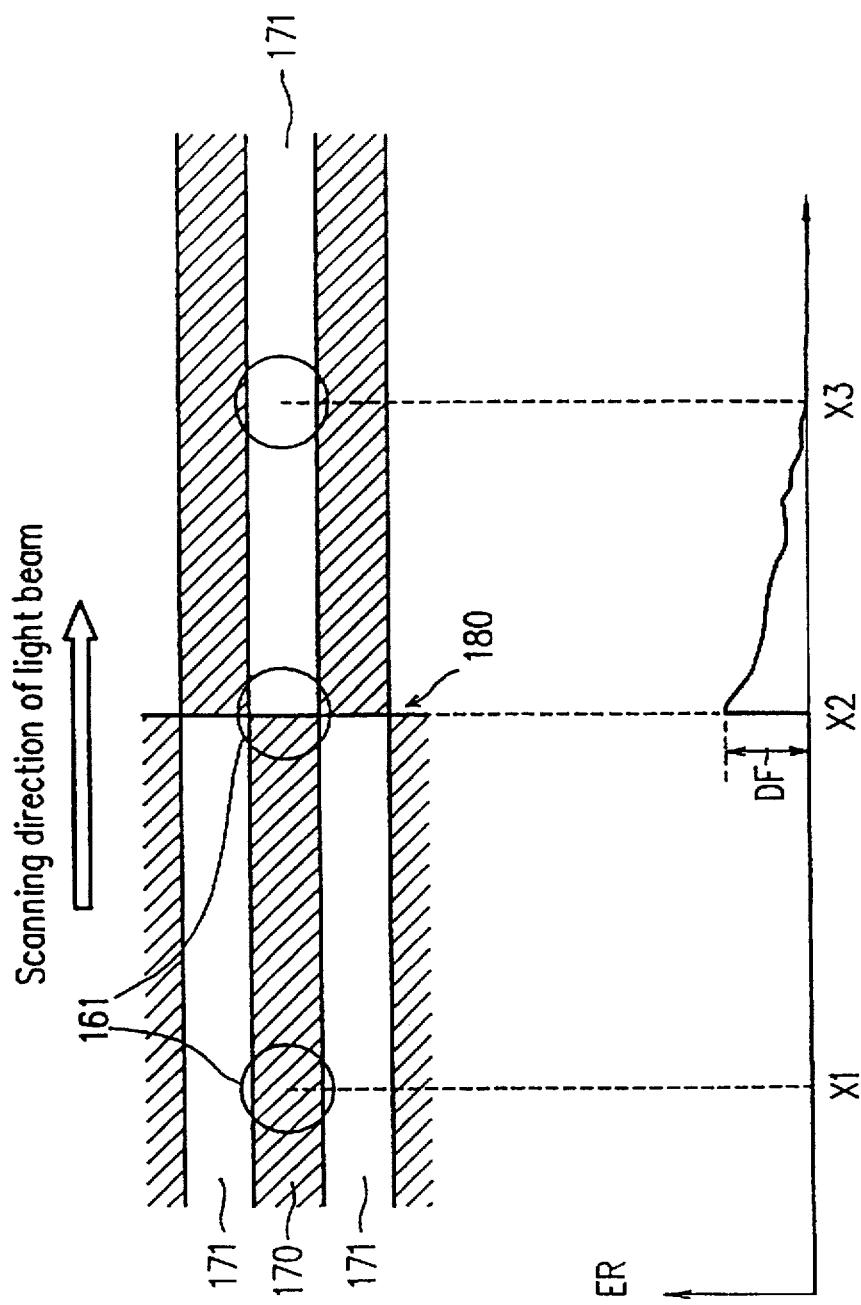

5,732,051

FOCUSING CONTROL APPARATUS USING DYNAMIC TARGET VALUE IN RELATION TO LAND/GROOVE

BACKGROUND OF THE INVENTION

1. Field of the Invention

The present invention relates to a focusing control apparatus for controlling a light beam so as to focus the beam on a recording medium; and also relates to a recording medium. More specifically, the present invention relates to a focusing control apparatus for recording and reproducing information on/from a recording medium having land tracks and groove tracks so that the recording and reproducing operations are not affected by a false difocus; and also relates to a recording medium.

2. Description of the Related Art

In recent years, an optical recording medium for recording information has become more and more important as a medium for accumulating several kinds of information such as sound and video, because such a medium may store a large capacity of data. An optical recording medium Generally has an uneven structure, i.e., a plurality of concave portions and Convex portions are spirally formed on such a medium. Since an optical recording medium is ordinarily disk-shaped, the optical recording medium will be herein referred to as a "disk". In general, a concave portion and a convex portion of a disk are called a "land" and a "groove", respectively. A disk is rotated at a high speed in order to read the information recorded on the spiral land or groove. For The purpose of reading the information without any contact with a medium, a light beam, a semiconductor laser beam, is focused on a disk, and then reflected by the disk. The recorded information is obtained based on the amount of light reflected by the disk.

A conventional focusing control technique is realized, for example, by a focusing control apparatus using an astigmatism method applicable to an optical type "recording and reproduction apparatus". Hereinafter, it will be assumed that a "recording and reproduction apparatus" will collectively include the following three kinds of apparatuses: namely, a recording apparatus, a reproduction apparatus, and an apparatus usable for both of recording and reproduction. In the same way, "recording and reproduction" will collectively include a recording operation alone, a reproduction operation alone, and recording and reproduction operations.

Referring to FIGS. 16A to 16E, the principle of an astigmatism method will be described below. In the astigmatism method, the light beam reflected by the disk after being focused on a disk by a pair of condensing lens and cylindrical lens is irradiated onto four-division photodetectors 160. FIGS. 16A to 16E show the respective shapes of the light beam 161 irradiated onto the four-division photodetectors 160 in accordance with the variation of the distance between a focal point of the light beam 161 and the disk. FIG. 16A shows the state where the focal point of the light beam 161 is farthest away from the disk; FIG. 16C shows the state where the light beam 161 is in focus; and FIG. 16E shows the state where the focal point of the light beam 161 is closest to the disk. FIG. 16B shows an intermediate state between the state of FIG. 16A and that of FIG. 16C; and FIG. 16D shows an intermediate state between the state of FIG. 16C and that of FIG. 16E. In FIGS. 16A to 16E, the longitudinal direction of a track (hereinafter, referred to as a "circumferential direction") corresponds to a vertical direction of the paper sheet, while the direction crossing a track (hereinafter, referred to as a "radial direction") corresponds to a horizontal direction of the paper sheet. The two division lines crossed at a right angle formed by the four-division photodetectors extend along the circumferential direction and the radial direction, respectively. A focusing error signal, i.e., a signal indicating the degree and the direction of an out-of-focus state, may be obtained in the following manner. First, the sum of the light amounts is calculated for the two pairs of two divided photodetectors which are positioned diagonally in the four-division photodetectors, that is, (A+D) and (B+C) are calculated. Then, the difference between the two light amounts of the two pairs of two photodetectors is calculated, thereby obtaining a focusing error signal 162, i.e., {(A+D)−(B+C)}. The principle and the construction of the astigmatism method are well-known to those skilled in the art. Therefore, the detailed description thereof will be omitted herein.

Recently, optical disks are required to have an ever higher recording density. An exemplary method for increasing the recording density of an optical disk is realized by reducing the interval, or pitch of a track (hereinafter, referred to as a "track pitch") on which information is recorded. In order to reduce the track pitch, an optical disk in a land/groove format (hereinafter, referred to as an "L/G disk") having a plurality of land tracks and groove tracks has been proposed.

FIG. 17 schematically shows an L/G disk. In a conventional optical disk, the recording and reproduction of information has been performed either on the grooves 170 for controlling a tracking, or on the lands 171 interposed between adjacent two grooves. To the contrary, an L/G disk utilizes both the lands and the grooves as The tracks for recording and reproducing the information. Accordingly, the track pitch equivalently becomes a half, so that the capacity of an optical disk may be doubled. The tracks of such an L/G disk are formed by arranging a plurality of groove tracks 170 using the grooves (the dotted portions in FIG. 17), and a plurality of land tracks 171 using the lands (the portions interposed between adjacent two groove tracks) alternately for every rotation of The disk. The tracks of the L/G disk are spirally formed by alternately arranging the groove tracks 170 and the land tracks 171, so the tracks are not discontinued over the entire surface of the disk. As a result, it becomes possible to record and reproduce the data continuously.

FIG. 18 is an enlarged view of the "boundaries in a radial direction between land tracks 171 and groove tracks 170" 180 (hereinafter, referred to as "boundaries" for simplification) encircled in FIG. 17. The "boundaries" 180 appear for every rotation of a disk, and the positions of the boundaries 180 between the tracks in the circumferential direction are determined so as to be disposed along an identical radius of the disk. The disk has an uneven structure, that is, the disk has a plurality of concave portions and convex portions in which an optical depth d of a groove is approximately an eighth of the wavelength k of a light source such as a semiconductor laser. The land tracks are flat portions without any grooves. Accordingly, if a light beam proceeds along these spiral track, then a spot of the light beam alternately exist in the groove tracks and the land tracks for every rotation of a disk.

At the edges having an optical depth of λ/8, the light beam is diffracted. Therefore, as is well known in the art, the interference pattern of the light beam reflected by an optical disk changes in a photodetector. With respect to the grooves, for example, the interference pattern changes because of the light diffracted by the edges in the circumferential direction. In a push-pull tracking method, a tracking error is detected by using the variation of this interference pattern so as to output a tracking error signal. It is also well-known in the art that the light diffracted by the edges affects a focusing error signal obtained by the astigmatism method. This is because the light diffracted by the grooves is not output uniformly from each of two pairs of two photodetectors diagonally disposed in four-division photodetectors.

The aberration of a light beam is one of the causes for the ununiformity of this diffracted light. It is impossible to manufacture or assemble the optical elements to be used for an optical head without any errors. Accordingly, the shape of a light beam to be focused and irradiated onto the disk does not become completely symmetrical with respect to the optical axis thereof, so that an aberration is generated. Another cause is the shape of the edges between the lands and the grooves in an actual optical disk. That is, the edges are not formed in a step shape having faces precisely perpendicular to the surface of the disk, but in a ramp shape having some inclination. Needless to say, this inclination is different in the individual disks. In addition, the inclination is different at the respective positions on one and the same disk. Therefore, it is impossible to produce both edges of one groove or one land completely symmetrically, and so the shapes of both edges are different from each other to a certain degree, as will be appreciated when viewing the cross section of the disk. A right edge and a left edge of a groove interchange in accordance with the position of the light beam spot on the disk, i.e., whether the light beam spot is located on the grooves or on the lands. As will be appreciated when viewing the cross section of an optical disk, assuming that the right edge of a groove is positioned on the right side of a light beam focused on the groove, then the right edge of the groove is positioned on the left side of the light beam when the light beam is focused on the land.

Because of the ununiform light diffracted by the edges, the interference pattern of the four-division photodetectors becomes unsymmetrical even when the light beam is in focus without any focusing error. In other words, the focusing error signal does not become zero although the light beam is in focus. A focusing error signal not corresponding to the actual out-of-focus (hereinafter, referred to as a "true difocus") will be herein referred to as a "false difocus" signal. Either the light beam is irradiated on the lands or on the grooves, the amount of the "true difocus" is approximately 0.1 μm. That is to say, difference between the distance between the condensing lens and the land and the distance between the condensing lens and the groove (hereinafter, referred to as a "groove depth") is approximately 0.1 μm. On the other hand, the focusing error signal caused by the false difocus has a level equivalent to the "true difocus" of approximately 2 μm.

When the light beam is in focus on a groove, for example, the positions of the four-division photodetectors of the optical system are adjusted so that the focusing error signal becomes zero. In this case, if the light beam is focused on the groove, the focusing error signal by the false difocus is not generated. As a result, the focusing control is not affected by the false difocus on the groove, so that the recording and reproduction of the information may be performed stably.

However, the interference pattern on the photodetector caused by the light diffracted by the disk changes in accordance with the positions of the irradiated light beam spot, i.e. whether the light beam is irradiated on the land or on the groove. As a result, even in the case where the focusing error is substantially zero, i.e. in the case where the light beam on the land is in focus, a false difocus is inadvertently generated.

In FIGS. 19A to 19C, the variations of the focusing error signal and the tracking error signal to be detected when a light beam 161 passes through the tracks in a radial direction of the disk are plotted. In the axes of ordinates of FIGS. 19B and 19C, the levels of the focusing error signal and the tracking error signal are shown respectively, while the positions of the light beam 161 in the radial direction of the optical disk are shown in the axes of abscissas. As shown in FIG. 19B, when the focusing error signal ER is adjusted to be zero on a groove track 170, the maximal value of the focusing error signal ER caused by the false difocus becomes DF on a land track 171. Since the velocity of the light beam 161 crossing through the tracks is sufficiently high, the frequency of the focusing error signal ER generated when the light beam 161 passes through the tracks, i.e., a reciprocal number of the number of the tracks crossed by the light beam 161 during a unit time period, is sufficiently higher than the response frequency of the focusing control system. Accordingly, the response of the focusing control system caused by the false difocus when the light beam 161 passes through the tracks in a radial direction may be neglected. The phase of the focusing error signal ER caused by the false difocus occurring when the light beam 161 passes through the tracks in the radial direction is shifted by 90 degrees as compared with the phase of the tracking error signal TR.

FIGS. 20A and 20B show the variation of the focusing error signal ER to be detected when the light beam 161 passes from a groove track 170 to a land track 171. FIG. 20A is a plan view schematically showing the positional relationship between the light beam 161 and the tracks in which the optical disk is seen from above the disk. In FIG. 20B, the variation of the level of the focusing error signal ER is plotted so as to correspond to the positional variation of the light beam 161 shown in FIG. 20A.

At the position X1 shown in FIG. 20B, the light beam 161 is positioned completely on a groove track 170, and the level of the focusing error signal ER is zero. This is because the focusing error signal ER owing to the false difocus caused when the light beam 161 is positioned on the groove track 170 is adjusted to be zero.

At the position X2 shown in FIG. 20B, the light beam 161 is at the point of passing over the boundary 180 between the groove track 170 and a land track 171. In the same way as in FIG. 19A, the level of the false difocus signal caused by the passage of the light beam 161 through the tracks in the radial direction is assumed to be DF. At the moment when the light beam 161 reaches the position X2, the level of the focusing error signal ER is DF because of the false difocus. However, in an actual operation, even when the light beam 161 reaches the position X2, the focusing state is substantially the same as the state at the position X1, i.e. "in focus" state. In other words, even though the level of the focusing error signal ER is DF caused by the false difocus, a true difocus is not generated. This is because the "groove depth" mentioned above is approximately 0.1 μm, whereas the focal depth of the light beam 161 is approximately ±1 μm. That is to say, as compared with the focal depth, the amount of the true difocus is small enough to be negligible.

In an L/G disk, the light beam is positioned alternately on a land track and a groove track for every rotation of a disk. The false difocus is generated while the light beam is positioned on the land track, i.e. the time period necessary for the light beam to scan the portion of the disk corresponding to one rotation of the disk. The rotation frequency of the disk is sufficiently lower than the response frequency of the focusing control system, as compared with the case where the light beam crosses through the tracks, i.e., the case where the light beam passes in the radial direction of the disk. More specifically, the rotation frequency of the disk is no more than several tens Hz, i.e., the rotation cycle is approximately several tens ms. Accordingly, in the case where the light beam scans alternately a land track and a groove track, the focusing control system having a response frequency of several kHz adversely responds to the focusing error signal caused by the false difocus having a frequency of several tens Hz. In addition, the amount of the difocus caused by the false focus is approximately 2 μm. Consequently, a true difocus is generated.

As shown in FIGS. 20A and 20B, during the time period required for the light beam 161 to pass from the position X2 to the position X3 (approximately several ms), the focusing control system controls the focusing error signal ER to be zero by the negative feedback of the focusing error signal ER. As a result, the focusing error signal ER is converged to zero at the position X3. As described above, the time period of several ms required for the light beam 161 to pass from the position X2 to the position X3 is sufficiently longer than the time period necessary for the focusing control system to settle the focusing error signal ER to substantially zero, i.e., the response time period of the focusing control system. It is true that the level of the focusing error signal ER is zero at the position X3, but in fact, a true difocus equivalent to a false difocus is generated, because the focusing control has been performed so as to converge the level DF of the focusing error signal ER owing to the false difocus to zero. The. level of the true difocus caused by the false difocus becomes different in each method for detecting the focusing error signal ER, each focusing control system, and each optical head. However, as compared with the focal depth, i.e., approximately ±1 μm, of a light beam; the level of the true difocus caused by the false difocus is considerably larger, i.e., several μm. Therefore, the true difocus makes it difficult to record and reproduce a signal, and causes a focusing control error.

However, the above-mentioned conventional techniques have a following problem. That is, a false difocus is generated because of the diffraction of a light beam at the edges of the tracks extending along the circumferential direction. Since the focusing control system for a light beam inadvertently responds to this false difocus, a true difocus is generated.

SUMMARY OF THE INVENTION

The focusing control apparatus of the invention for controlling a light beam so as to focus the light beam on a recording medium on which a spiral track including land track portions and groove track portions, both of the portions recording and reproducing information, is provided, includes: a focusing means for focusing the light beam on the recording medium; a focusing state detection means for detecting a focusing state of the light beam on the recording medium so as to output a signal indicating the focusing state; a control means for maintaining the focusing state of the light beam on the recording medium by moving the focusing means based on a comparison between an output value from the focusing state detection means and a target value; and a target value setting means for setting the target value at a first level when the light beam is irradiated on the land track portions, and for setting the target value at a second level, different from the first level, when the light beam is irradiated on the groove track portions.

In one embodiment, the land track portions and the groove track portions are alternately arranged and connected in series so as to form the spiral track.

In another embodiment, the target value setting means switches the target value between the first level and the second level, when the output from the focusing state detection means is varied by a predetermined value or more.

In still another embodiment, the target value setting means switches the target value between the first level and the second level in response to a signal generated by an identifier recorded on the recording medium.

In still another embodiment, the target value setting means switches the target value between the first level and the second level after a predetermined time period has passed from a time when the target value setting means receives the signal generated by the identifier.

In still another embodiment, the target value setting means switches the target value between the first level and the second level in response to a signal generated by an address pit provided on the recording medium.

In still another embodiment, the target value setting means switches the target value between the first level and the second level after a predetermined time period has passed from a time when the target value setting means receives the signal generated by the address pit.

In still another embodiment, the predetermined time period is determined based on information recorded by the address pit.

In still another embodiment, the target value setting means includes a sampling means for sampling the output from the focusing state detection means, and at least one of the first level and the second level is set based on a sampled value of the output from the focusing state detection means.

In still another embodiment, the sampling means samples the output from the focusing state detection means within a predetermined time period from a time when the light beam passes over a boundary between each of the land track portions and each of the groove track portions.

In still another embodiment, the predetermined time period is shorter than a response time period of the control means.

In still another embodiment, the sampling means samples the output from the focusing state detection means in response to a signal generated by an address pit provided on the recording medium, and a time period DT from a time when the light beam passes through the address pit to a time when the output from the focusing state detection means is sampled is more than w/v, where v is a scanning linear velocity of the light beam on a track portion on which the light beam is irradiated, and w is a distance between the address pit and the boundary.

In still another embodiment, the distance w between the address pit and the boundary is determined based on address information generated by the address pit provided on the recording medium.

In still another embodiment, the sampling means samples the output from the focusing state detection means based on a predetermined scanning linear velocity of the light beam and a signal generated by an identifier provided on the recording medium so as to indicate a position of a boundary between each of the land track portions and each of the groove track portions.

According to another aspect of the invention, a recording medium including a spiral track on which land track portions and groove track portions are alternately arranged and connected in series is provided. Both of the land track portions and the groove track portions record and reproduce information. In the recording medium, the spiral track includes identifiers indicating positions of boundaries between the land track portions and the groove track portions, and the identifiers are provided being separated from the boundaries by a predetermined distance.

In one embodiment, one of the identifiers is provided in a vicinity of the boundaries.

In another embodiment, the one of the identifiers is disposed at a position in a direction opposite to a track scanning direction of a light beam with respect to the boundaries.

In still another embodiment, a settling region is provided between the one of the identifiers and the boundaries, and a state of a signal corresponding to a focusing error signal of the light beam irradiated on the track portions is substantially settled to a state before the light beam reaches the one of the identifiers.

In still another embodiment, the identifiers have track address information for identifying the track portions.

In still another embodiment, the track address pit functions as the identifiers.

In still another embodiment, a length w of the settling region is more than v·Tr, where v is a scanning linear velocity of the light beam on the track portion on which the light beam is irradiated, and Tr is a rising time of a control means for controlling a focusing of the light beam.

In still another embodiment, the identifiers include information about the length of the settling region.

In still another embodiment, the recording medium is disk-shaped and the track is formed on each of two sides of the recording medium.

In still another embodiment, the recording medium is formed by attaching at least two disk-shaped recording media to each other.

In still another embodiment, the recording medium includes a substrate and a recording layer.

In still another embodiment, the recording layer is a phase change type recording layer.

According to a focusing control apparatus of the invention, a target value of the focusing control is varied in accordance with the location of a light beam spot, i.e., whether the light beam is irradiated on a land track or on a groove track. Even if a focusing error signal is generated by a "false difocus" occurring in spite of the substantially in-focus state of a light beam, it becomes possible to eliminate the effect of the false difocus from the focusing control by setting a target value equal to the level of the generated focusing error signal.

In the case where the target value of the focusing control is set by sampling the focusing error signal caused by the false difocus, the sampling timings may be determined by detecting the variation of the focusing error signal itself. Accordingly, it is not necessary to record the information about the sampling timings on a recording medium itself.

A recording medium of the invention is provided with identifiers indicating the positions of the boundaries between the land tracks and the groove tracks. The timings for sampling the focusing error signal may be determined as the target values of the focusing control by using these identifiers. As a result, an appropriate focusing error signal may be sampled before the focusing control system is affected by the false difocus, that is to say, before the focusing error signal reflects the false difocus.

A predetermined distance is provided between an identifier and a boundary, so that only the focusing error signal corresponding to the false difocus may be sampled after the focusing error signal caused by the effect of the identifier (e.g. an address portion) is settled.

In the case where the information for determining the sampling timings, e.g., the distance from an identifier to a boundary between a land and a groove, is recorded on a recording medium itself, the sampling may be conducted at appropriate timings, even if the distance is different at the respective positions on the disk.

Thus, the invention described herein makes possible the advantages of providing a focusing control apparatus and a recording medium for eliminating the effects of the difocus from the focusing control, even if the level of the focusing error signal is varied owing to the false difocus. Consequently, according to the present invention, in an optical disk where information is recorded and reproduced on/from a land track and a groove track, it is also possible to realize a focusing control of high precision.

These and other advantages of the present invention will become apparent to those skilled in the art upon reading and understanding the following detailed description with reference to the accompanying figures.

BRIEF DESCRIPTION OF THE DRAWINGS

FIGS. 7A to 7G show the operation of the focusing control where the light beam passes from a groove track to a land track in a focusing control apparatus and a recording medium of the present invention.

FIGS. 8A to 8G show the operation of the focusing control where the light beam passes from a land track to a groove track in a focusing control apparatus and a recording medium of the present invention.

FIGS. 15A to 15H illustrate the operation of the focusing control apparatus shown in FIG. 14.

FIGS. 20A and 20B illustrate the variation of the focusing error signal during the passage of the light beam from a groove track to a land track.

DESCRIPTION OF THE PREFERRED EMBODIMENTS

Figure 1:
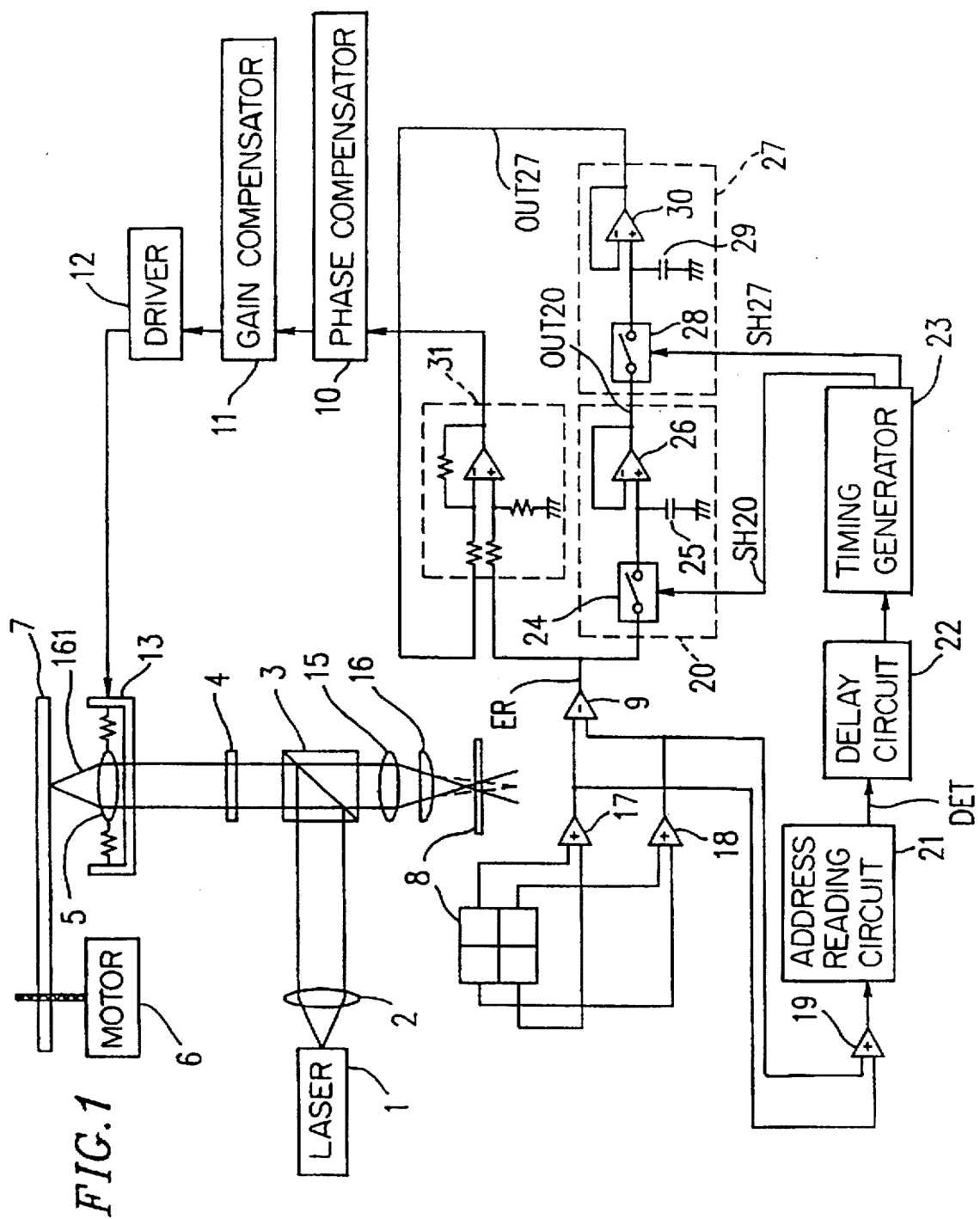
FIG. 1 is a block diagram of a focusing control apparatus according to a first example of the present invention.

Hereinafter, the present invention will be described by way of illustrative examples with reference to the accompanying drawings. It is noted that the same reference numerals denote the same components in the following description.

EXAMPLE 1

FIG. 1 is a block diagram of a focusing control apparatus according to a first example of the present invention. A semiconductor laser 1 emits a light beam 161 for recording and reproducing information. The emitted light beam 161 is collimated by a collimator lens 2; reflected by a polarization beam splitter 3; and then passed through a λ/4 plate 4 (λ is the wavelength of the light beam 161). A condensing lens 5 condenses and irradiates the light beam 161 passed through the λ/4 plate 4 onto a disk 7. The disk 7 is rotated by a motor 6.

The light beam reflected by the disk 7 is passed through the condensing lens 5, the λ/4 plate 4, and the polarization beam splitter 3; focused by a detection lens 15 and a cylindrical lens 16; and then irradiated onto the four-division photodetectors 8. The detection lens 15 and the cylindrical lens 16 intentionally generate the astigmatism. The four-division photodetectors 8 detect by the astigmatism method the amount of the focusing error, which is used for generating the focusing error signal. The principle and the construction of the astigmatism method are well-known to those skilled in the art.

Using the outputs of the four-division photodetectors 8, adders 17 and 18 calculate the sum of the light amounts of two pairs of diagonally disposed photodetectors. A differential circuit 9 receives the outputs from the adders 17 and 18, and calculates the difference between the two outputs, thereby outputting the focusing error signal ER indicating the focusing state of the light beam 161 on the disk 7. The focusing error signal ER output from the differential circuit 9 is supplied to a non-inverting input of a differential amplifier 31 having a unity gain, i.e., an amplification ratio of 1. The output of the differential amplifier 31 is input to a phase compensator 10 for securing the control stability of the focusing control system. The output of the phase compensator 10 is input via a gain compensator 11 for securing a loop gain required for the focusing control to a driver 12. A focusing actuator 13 drives the condensing lens 5 in a direction substantially parallel to the optical axis of the light beam 161 in accordance with the output of the driver 12, so as to focus the light beam 161. In this way, a loop of the focusing control system is constituted by the above-mentioned elements, as shown in FIG. 1.

A signal to the inverting input and the non-inverting input of the differential amplifier 31 is output at a unity gain. The target value (generally represented by a constant voltage) of the focusing control is applied to the inverting input. Here, it is assumed that the stationary state of the focusing control system is obtained by the operation of the focusing control. The level of the focusing error signal ER output from the differential circuit 9 is converged to an offset value equal to the target value which is applied to the non-inverting input of the differential amplifier 31. Accordingly, by varying the input to the non-inverting input terminal of the differential amplifier 31, a DC voltage level of the focusing error signal ER to be converged, i.e., the target value of the focusing control, may be set arbitrarily.

The focusing error signal ER output from the differential circuit 9 is input to a sample and hold circuit 20 for holding the focusing error signal. The output of the sample and hold circuit 20 is further input to a sample and hold circuit 27. The output of the sample and hold circuit 27 is supplied to the inverting input of the differential amplifier 31 as the target value of the focusing control.

The outputs of the adders 17 and 18 are added by an adder 19. The output signal of the adder 19, indicating the amount of the light reflected by the disk 7, is input to an address reading circuit 21, so that addresses ID0 or ID3 recorded on the disk 7 are read as will be described later. When the address reading circuit 21 reads an address ID0, the circuit 21 outputs an ID0 detection signal DET via a delay circuit 22 to a timing generator 23. When the ID0 detection signal DET is input to the timing generator 23, the timing generator 23 outputs hold signals SH20 and SH27 to the sample and hold circuits 20 and 27 respectively at predetermined timings as will be described later. As mentioned above, the sample and hold circuits 20 and 27 hold the respective input signals while the hold signal is at a HIGH level, whereas the circuits 20 and 27 output the sampled input values while the hold signal is at a LOW level. The delay amount of the delay circuit 22 will be described later.

Figure 2:
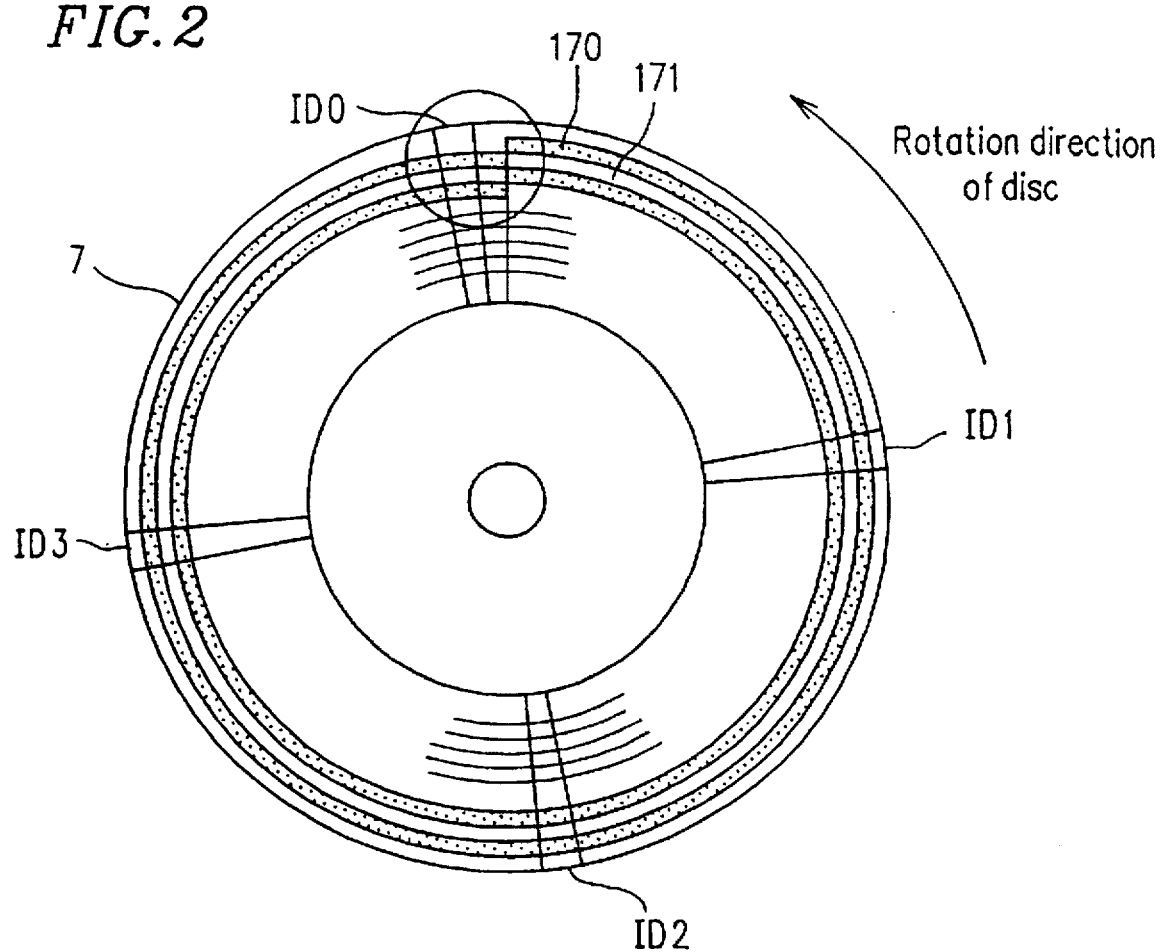
FIG. 2 is a plan view schematically showing the configuration of the disk 7 used for the focusing control apparatus of the present invention.

FIG. 2 schematically shows the configuration of a disk 7 to be used for a focusing control apparatus of the present invention. On the surface of the disk 7, a plurality of groove tracks 170 (dotted portions in FIG. 2) constituted by the concave grooves having an optical depth (determined in consideration of a refractive index as well) of about λ/8 with respect to the wavelength λ of the light beam 161 emitted from the semiconductor laser 1, and a plurality of land tracks (portions interposed between two adjacent groove tracks) constituted by convex lands 171 are formed. The land tracks and the groove tracks are alternately arranged for every rotation of the disk 7. As a result, a single spiral connected in series is formed over the entire surface of the disk 7. The boundaries between the land tracks and the groove tracks appear on the spiral track for every rotation of the disk 7. The boundaries are positioned along an identical radius of the disk 7. In addition, a set of four address portions ID0 to ID3 for identifying the tracks is provided at regular intervals for every track along the circumferential direction on the disk 7. Each address portion is provided with not only a track address for identifying the tracks, but also a sector address for identifying which of the four address portions ID0 to ID3, appearing during one rotation of the disk, the present address portion is.

Figure 3:
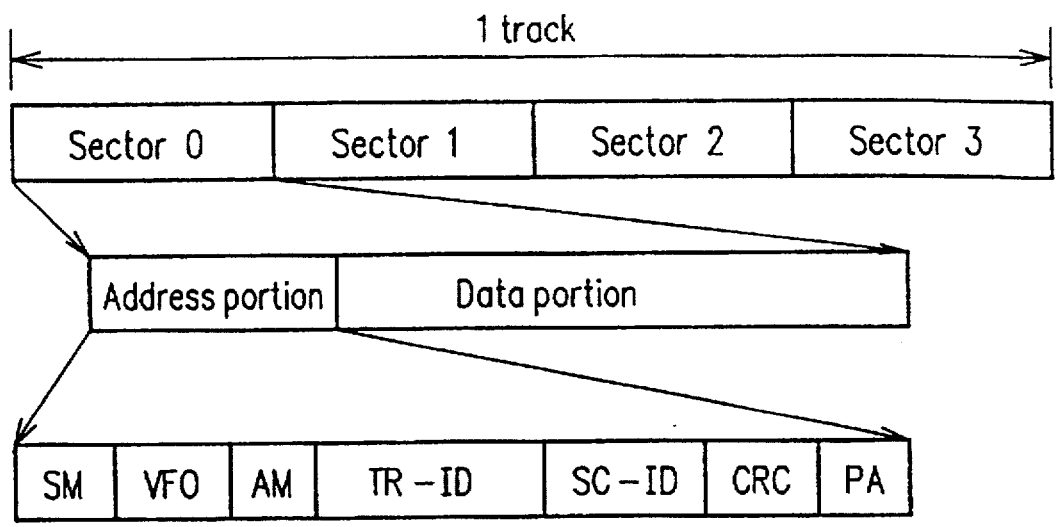
FIG. 3 is a format diagram of each track on the disk shown in FIG. 2.

FIG. 3 shows an exemplary format of the tracks on the disk shown in FIG. 2. Each track is divided into four sectors, i.e., a sector 0 through a sector 3. Each sector consists of an address portion and a data portion for recording and reproducing information. In an address portion, a sector mark SM indicating the beginning of a sector; a voltage-controlled frequency oscillator field VFO for pulling-in PLL for reading signal; an address mark AM indicating the beginning of the address; a track address TR-ID; a sector address SCID; a cyclic redundancy check code CRC for checking an error; and a post amble PA indicating the end of the address portion are arranged so as to be read in this order. The address reading circuit 21 reads out this sector address, so as to determine on which track the light beam 161 is positioned, and determine on which sector of one track the light beam 161 is positioned. The address portions of the respective tracks are disposed along an identical radius of the disk.

Referring to FIG. 2 again, the address ID0 is the address to be read at the end of each track. That is to say, the light beam, after passing the address ID0, does not pass any other address ID1 to ID3 until the light beam passes over a boundary. The address ID0 is positioned in a backward direction with respect to the track scanning direction of the light beam. It is noted that "a light beam scans a track" means "an irradiation spot of the light beam on the disk scans a track along a circumferential direction of the disk".

Figure 4:
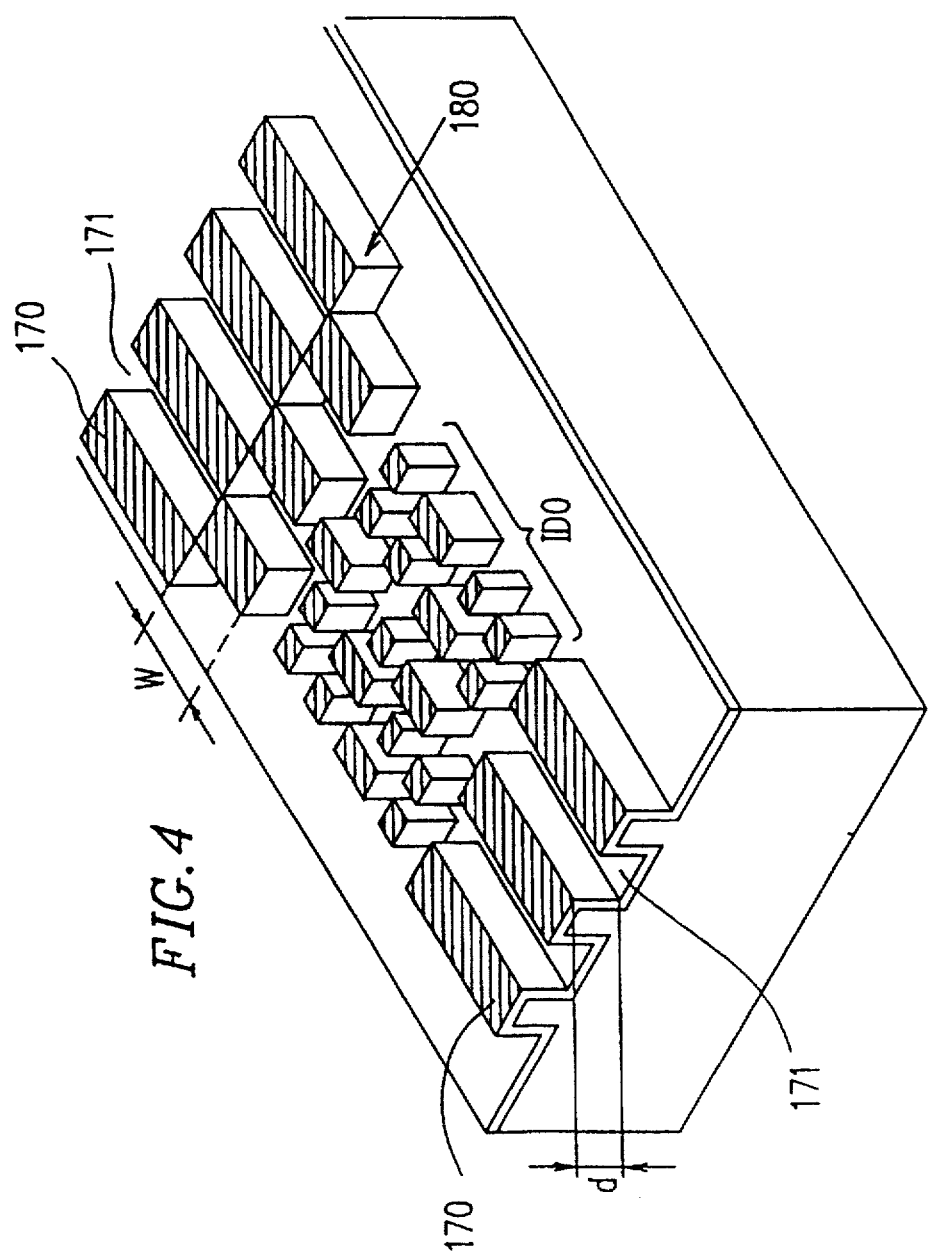
FIG. 4 is an enlarged perspective view of the encircled portion of FIG. 2 showing the vicinity of the address portion ID0 and the boundary.

FIG. 4 is an enlarged perspective view showing the vicinity of the address portion ID0, indicated by a circle in FIG. 2, and the boundary 180. An address portion is formed of lines of pits having an uneven structure, which stores the address information. The address reading circuit 21 receives a signal indicating the variation of the amount of the light reflected by the lines of pits, thereby detecting the position of the light beam. Each pit has a width smaller than a track pitch, and has a length approximately equal to a radius or a diameter of a light beam spot. Accordingly, the variation of the focusing error signal caused by the diffraction of light beam on the lines of pits for the address information is very small as compared with the variation of the focusing error signal caused by the false difocus. As shown in FIG. 4, the address portion ID0 is provided "before the boundary 180", being separated from the boundary 180 by the distance w. Herein, "before the boundary 180" means "in the backward direction with respect to the scanning direction of the light beam". The same kind of land track or groove track as that disposed before the address portion ID0 exists between the address portion ID0 and the boundary 180.

Figure 5:
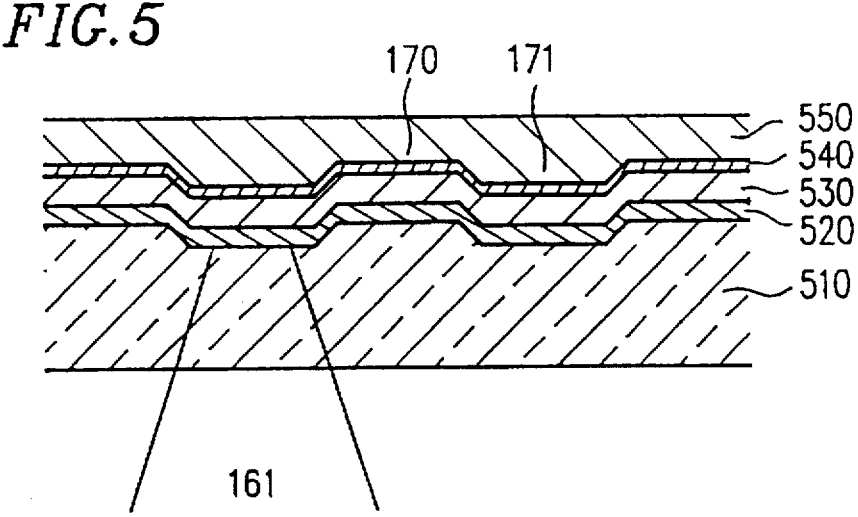
FIG. 5 is a cross-sectional view of the disk 7, an exemplary recording medium of the present invention.

FIG. 5 is a cross-sectional view of the disk 7, an exemplary recording medium according to the present invention. The disk 7 includes, from the bottom to the top of FIG. 5, a substrate 510, made of polycarbonate, etc., having uneven tracks thereon formed by an injection molding method, or the like; an thermal insulating dielectric layer 520; a recording film 530 made of a phase change type recording material for recording and reproducing information by way of a light beam 161; a reflective film 540 for preventing the transmission of the light beam 161; and a protection layer 550 for protecting the respective layers mentioned above from a scratch and the like. The light beam 161 is irradiated from the substrate side of the disk 7, thereby recording 10 and reproducing the information. For convenience, in this specification, a track projecting toward an incident side of light beam 161 with respect to the disk 7 is called a "land track" 171, and a track interposed between adjacent two land tracks is called a "groove track" 170. However, in some cases, a track projecting toward the incident side of light beam 161 is defined as a "groove track", and a track interposed between adjacent two groove tracks is defined as a "land track". A magnetooptical recording layer may also be used as a recording film.

Figure 6:
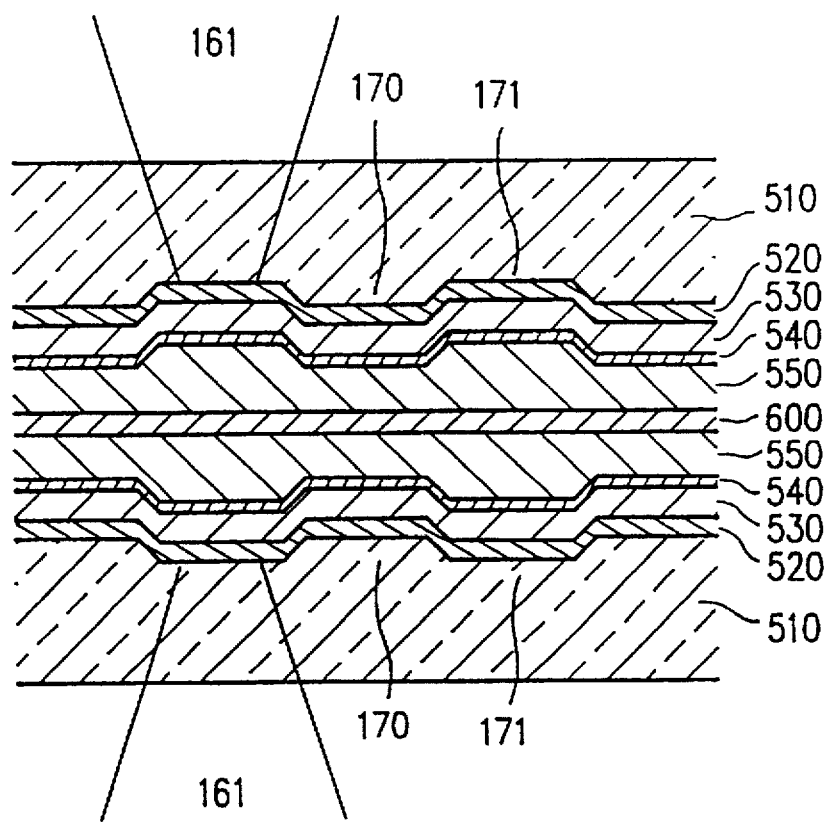
FIG. 6 is a cross-sectional view of a double-sided disk.

FIG. 6 is a cross-sectional view of a double-sided disk for realizing an even larger memory capacity. A double-sided disk is formed by attaching two single disk plates shown in FIG. 5 to each other so that the respective protection layers 550 are in contact with each other via a binding layer 600. In the case of recording and reproducing information on/from such a double-sided disk, the light beam 161 may be irradiated from both sides of the disk, i.e., from the upper side and the lower side, as shown in FIG. 6. As a result, one double-sided disk has a memory capacity equal to that of two single disk plates. The present invention is applied cable to both a single disk plate and a double-sided disk. In both cases, a similar construction is employed and similar effects are obtained. Therefore, the present invention will be described below as being applied to a single disk plate. However, it would be obvious for those skilled in the art that the focusing control apparatus and the recording medium of the present invention are also applicable to a double-sided disk.

FIGS. 7A to 7G show the focusing control operation in the focusing control apparatus and the recording medium of the present invention. FIG. 7A schematically shows the respective positions of the light beam 161 passing through the tracks when the disk 7 rotates. AS shown in FIG. 7A, the light beam 161 scans along a groove track 170; passes through an address portion ID0 and a boundary 180 between a land track 171 and the groove track 170; and then reaches the land track 171. In FIGS. 7B, 7C, 7D, 7E, 7F, and 7G, the axes of ordinates indicate the respective levels of an ID0 detection signal DET; a hold signal SH20 supplied to the sample and hold circuit 20; a hold signal SH27 supplied to the sample and hold circuit 27; a focusing error signal ER; an output signal OUT20 of the sample and hold circuit 20; and an output signal OUT27 of the sample and hold circuit 27, when the light beam 161 scans the tracks as shown in FIG. 7A. The axes of abscissas in FIGS. 7B to 7G, indicating the time, are drawn so as to correspond to the axis of abscissas of FIG. 7A. That is to say, if the distance Xa in the axis of abscissas of FIG. 7A and the time Tb in the axes of abscissas of FIGS. 7B to 7G are expressed by the same length, the relationship between the distance Xa and the time Tb is expressed by Xa=v·Tb, where v denotes the linear velocity of the track scanning of the light beam 161.

In the description referring to FIGS. 7A to 7G, for simplification, it is assumed that the difocus is not generated on a groove track 170, i.e., the light beam spot on the groove track is in focus, and that the focusing error signal ER is adjusted to be zero. The levels of the hold signals SH20 and SH27 output from the timing generator 23 are set at a LOW level and a HIGM level, respectively. In this case, since the switch 24 of the sample and hold circuit 20 is closed, the sample and hold circuit 20 outputs a signal equal to the input signal and a capacitor 25 is charged to the same level as the input signal. The switch 28 of the sample and hold circuit 27 is open, so that the sample and hold circuit 27 outputs a voltage held in a capacitor 29. For simplification, it is assumed that an initial value of the hold voltage of the capacitor 29 is zero and that the initial value of the output of the sample and hold circuit 27 is also zero. Accordingly, the input value to the inverting input terminal of the differential amplifier 31 for setting the target position of the focusing control, i.e., the target value of the focusing control is zero.

When the light beam 161 is positioned on the address portion ID0, the focusing error signal ER is varied because of the diffraction by the edges of the address portion along the circumferential direction. However, the width and the length of the lines of pits in the address portion ID0 are smaller than the diameter of the light beam 161. Therefore, in general, the amount of the false difocus caused by the diffraction of the address portion ID0 is extremely small, and the focusing error signal ER is varied slightly. The distance w between the address portion ID0 and the boundary 180 is set so that the small variation of the focusing error signal ER by the address portion ID0 is sufficiently converged until the focusing error signal ER is sampled as will be described later. In other words, the distance w is more than v·Tr, where v denotes the scanning linear velocity of the light beam 161 with respect to the disk and Tr is response time period determined by the response characteristics of the focusing control system.

The address reading circuit 21 outputs an ID0 detection signal DET to the delay circuit 22 at the time T1 when the light beam 161 is positioned at the back end of the address portion ID0. The ID0 detection signal DET is delayed by the delay circuit 22 and input to the timing generator 23 at the time T3. The delay time DT determined by the delay circuit 22 is equal to the time period necessary for the light beam 161 to pass the distance w so as to reach the land track 171 over the boundary 180, i.e., (T3–T2). At the time T2, a focusing error signal ER corresponding to the false difocus mentioned above is generated in a step shape. One of the features of the present invention lies in that the focusing error signal ER corresponding to this false difocus Is sampled so as to be used as a target value of the focusing control. Therefore, the focusing error signal ER on the land track 171 is required to be sampled by the sample and hold circuit 20 at the time T3. This is why, a difference ΔT between the time T1 when the light beam 161 passes the back end of the address portion ID0 and the time T2 when the light beam 161 passes over the boundary 180 is required to be at least less than the delay time Dr. That is to say, the delay time DT has a lower limit. In addition, in the case where the control system is realized by an actual hardware, the false difocus is not reflected to the focusing error signal ER at the instant the light beam 161 reaches the land track 171, but a certain time lag exists. Accordingly, in order to sample the focusing error signal ER indicating the false difocus, a certain margin must be present between the time T2 and the time T3.

On the other hand, the delay time DT also has an upper limit. This is because the target value for focusing control on a land track 171 is required to be replaced with a target value on a groove track 170 after the time T2 and before the control system completely responds to a focusing error signal ER caused by a false difocus. As shown in FIG. 7E, when a focusing error signal ER having a level DP caused by a false difocus is generated at the time T2, the focusing control system responds to the false difocus. As a result, the level of the focusing error signal ER caused by the false difocus decreases to a level DF' at the time T3. In the case where the target value of the focusing control is equal to the focusing error signal ER on a groove track 170 (in this case, a signal having a level of zero), the control system operates so as to converge the level of the focusing error signal ER to zero, so that a true difocus is inadvertently generated. Accordingly, the delay time DT must be set to be short enough to neglect the response of the focusing control with respect to the false difocus. In other words, the focusing error signal ER is required to be sampled within a range where the level DF may be regarded as substantially equal to the level DF'. If the difference between the level DF and the level DF' is too large, the target value of the focusing control is disadvantageously shifted, so that the effect of false difocus is caused. Consequently, it is at least necessary to set the time period (T3–T2) to be shorter than the response time period Tr of the focusing control system. More preferably, the time period (T3–T2) is required to be shorter than Tr/3 to Tr/10.

In this example, the delay time DT is set so as to satisfy the equation ΔT=w/v<DT<ΔT+Tr, where ΔT denotes the time period necessary for the light beam 161 to reach the land track 171 from the time when the ID0 detection signal DET is output, and Tr denotes the response time period of the control system. In the case where the distance w is varied in accordance with the respective positions of the light beam 161 on the disk, i.e., the respective tracks being scanned, the distance w may be calculated based on the track information (or the track position) obtained from the address portion. In such a case, if the distance w is in proportion to the radius of a track, the distance w may be determined using the track position.

When the timing generator 23 receives the ID0 detection signal DET delayed by the delay time DT, the timing generator 23 sets the hold signal SH20 at a HIGH level during the time period HT1 from the time T3 to the time T5. As a result, the sample and hold circuit 20 holds the focusing error signal ER of the time T3 during the time period HT1. Since the delay time DT of the delay circuit 22 is set at the above-mentioned value, the sample and hold circuit 20 holds the focusing error signal ER having the level of DF caused by the false difocus occurring on the land track 171. The timing generator 23 sets the hold signal SH20 at the HIGH level at the time T3, and at the same time, lowers the level of the hold signal SH27 from the HIGH level to the LOW level during the time period HT2 from The time T3 to the time T4. When the level of the hold signal SH27 becomes LOW, the switch 28 is closed and the charging of the capacitor 29 is begun, so that the output OUT27 of the sample and hold circuit 27 becomes equal to the input. At the time T4 later than the time T3 by the time period HT2, the level of the hold signal SH27 becomes HIGH again. The sample and hold circuit 27 holds the input, i.e., the focusing error signal ER caused by the false difocus occurring on the land track 171 and then outputs the signal.

As described above, since the output of the sample and hold circuit 27 is input to the inverting input terminal of the differential amplifier 31, the value of the focusing error signal ER caused by the false difocus on the land track 171 becomes the target value of the focusing control after the time T4. Accordingly, on the land track 171, the focusing control system is not affected by the focusing error signal ER reflecting the false difocus, so that the generation of the true difocus may be prevented.

At the time T5 later than the time T3 by the time period HT1, the level of the hold signal SH20 is set to be LOW again, so that the sample and hold circuit 20 outputs the input focusing error signal ER without holding the signal. Accordingly, the time period HT1 is set to be longer than the time period HT2.

FIGS. 8A to 8G show the focusing control operation in the focusing control apparatus and the recording medium of the present invention, where the light beam 161 passes from a land track 171 to a groove track 170. FIGS. 8A to 8G are views corresponding to FIGS. 7A to 7G. However, in FIGS. 8A to 8G, the time period required for one rotation of the disk has passed since each time T1 to T5 in FIGS. 7A to 7G. FIG. 8A schematically shows the respective positions of the light beam 161 passing through the tracks when the disk 7 rotates. As shown in FIG. 8A, in this case, the light beam 161 scans along a land track 171; passes through an address portion ID0 and a boundary 180; and then reaches the groove track 170. In FIGS. 8B, 8C, 8D, 8E, 8F, and 8G, the axes of ordinates indicate the respective levels of an ID0 detection signal DET; a hold signal SH20 supplied to the sample and hold circuit 20; a hold signal SH27 supplied to the sample and hold circuit a focusing error signal ER; an output signal OUT20 of the sample and hold circuit 20; and an output signal OUT27 of the sample and hold circuit 27, when The light beam 161 scans the tracks as shown in FIG. 8A. The axes of abscissas in FIGS. 8B to 8G, indicating the time, are drawn so as to correspond to the axis of abscissas of FIG. 8A.

On a land track 171, the focusing error signal ER has been offset by the level DF of the focusing error signal ER caused by The false difocus which was sampled and held by The sample and hold circuit 27 at a time earlier by the time period corresponding to one rotation of the disk, i.e., at the time T3. However, at this time, a true difocus is not generated. That is to say, the light beam 161 is in focus on the disk 7.

Before the time TS, the hold signals SH20 and SH27 are set at a LOW level and a HIGH level, respectively by the timing generator 23, as described above. Accordingly, the sample and hold circuit 20 outputs a signal having a level equal to the level of the input signal, and the sample and hold circuit 27 outputs a focusing error signal ER caused by the false difocus which was sampled at a time earlier by the time period substantially corresponding to one rotation of the disk. When the light beam 161 is positioned on the address portion ID0, the focusing error signal ER is varied owing to the diffraction of the light beam 161 by the edges of the address portion along the circumferential direction. However, the variation of the focusing error signal ER is very small, a large difocus is not generated by the address portion ID0.

The address reading circuit 21 outputs the detected ID0 detection signal DET to the delay circuit 22 at the time T6 when the light beam 161 is positioned at the back end of the address portion ID0. The ID0 detection signal DET is delayed by the delay circuit 22 and input to the timing generator 23 at the time T8. The timing generator 23 sets the level of the hold signal SH20 at HIGH during the time period HT1, as described above. As a result, the sample and hold circuit 20 holds the focusing error signal ER of the time T8. The time T8 is a time immediately after the light beam 161 passes over the boundary 180 between the land track 171 and the groove track 170 and reaches the groove track 170. Therefore, the false difocus, which was generated on the land track 171, is not generated any longer, and the level of the focusing error signal ER returns to substantially zero. Consequently, the sample and hold circuit 20 samples and holds the signal at substantially zero level.

The timing generator 23 lowers the level of the hold signal SH27 from the HIGH level to the LOW level during the time period HT2 from the time T8 to the time T9. After the time T9, the signal held by the sample and hold circuit 20 is held and output by the sample and hold circuit 27. As a result, the target value of the focusing control on the grove track may be set at substantially zero level, i.e., in-focus state, without depending on the false difocus signal on the land track 171.

At the time T10 later than the time T8 by the time period HT1, the level of the hold signal SH20 is set to be LOW again. As a result, the sample and hold circuit 20 outputs the focusing error signal ER without holding the signal. After the time period substantially corresponding to one rotation of the disk, the light beam 161 passes over the boundary again, and then passes from another groove track 170 to another land track again. Thereafter, the operation described with reference to FIGS. 7A to 7G and FIGS. 8A to 8G will be repeated for every two rotations of the disk.

By using the above-described configuration, it becomes possible to eliminate the effects of the false difocus from a disk where land tracks and groove tracks are alternately arranged for every rotation of the disk. That is to say, by using a biased sample value as the target value of the focusing control, it becomes possible to prevent the control where the focusing error signal ER caused by the false difocus becomes zero, resulting in the true focus. As a result, a focusing control apparatus for always maintaining the in-focus state on both groove tracks 170 and the land tracks 171 may be realized.

In the above-described example, by using the ID0 detection signal PET indicating the passage of the light beam through the address portion ID0 as a trigger for the timing generator 23, the hold signals SH20 and SH27 to be supplied to the sample and hold circuits 20 and 27 are generated. However, the trigger is not limited to the ID0 detection signal PET. In the case of using a detection signal at an address other than ID0, e.g., ID3, the same effects may be attained in the following manner. The address reading circuit 21 detects the address portion ID3, and then outputs the ID3 detection signal to the delay circuit 22. The delay circuit 22 delays and outputs the ID3 detection signal to the timing generator 23. In place of the above-mentioned delay time DT1, the delay time PT3 of the delay circuit 22 is set to be equal to the time period necessary for the light beam 161 to pass from the back end of the address portion ID3 to the position immediately over the boundary 180 as the disk 7 rotates. That is to say, if the rotation cycle of the disk 7 is TROT and the number of addresses passed by the light beam during one rotation cycle of the disk is N, the delay time PT3 may be set equal to (DT1+TROT/N). For example, in the disk 7 of this example, N is four.

By setting the delay time in the above-mentioned manner, the timing of the ID3 detection signal may accord with the timing of the ID0 detection signal mentioned above. In the case of using the detection signal ID3 as a trigger, it is also possible to operate the timing generator 23, and the sample and hold circuits cults 20 and 27 just in the same way as in the above-described example, thereby obtaining the same effects. More generally, an address portion positioned as an n-th address from the boundary 180 may also be utilized. In this case, the delay time DT(n) of the delay circuit 22 may be set equal to (DT1+n·TROT/N).

Even if the scanning linear velocity of the light beam 161 is not constant, the scanning linear velocity may be obtained based on the track information. For example, in the case where the linear velocity is varied in accordance with the respective positions on the tracks, the track positions are detected from the address portion, thereby calculating the linear velocity on the detected track. By setting the delay time in accordance with the linear velocity thus obtained the sampling may be performed at appropriate timings even when the linear velocity is not constant.

As described above, according to the present invention, by providing a target value setting circuit for setting a target value of the focusing control; a detector for detecting the boundary between a land track and a groove track; and sample and hold circuits for sampling and holding the focusing error signal, the focusing error signal which is sampled and held immediately over the boundary is set as a target value of the focusing control by the target value setting circuit. As a result, even in the case where a false difocus on the groove track and the land track affects the focusing error signal, the in-focus position may be set as the target Value of the focusing control system. Consequently, according to the present invention, a focusing control may be conducted without receiving any effect of the false difocus.

In the first example, every time each track is scanned, the focusing error signal is sampled. As a result, even if the level of the focusing error signal caused by the false difocus is varied owing to (1) the environment around the disk, e.g., temperature, humidity, and the like; (2) the position on the disk, i.e., either on inner tracks or on outer tracks; and (3) the manufacturing errors and irregularity of each disk, it is possible to use an appropriate target value on each track by means of sampling the focusing error signal caused by the false difocus. Consequently, the precision of the focusing control may be advantageously improved.

In the above-described example, the target value of the focusing control on the land tracks and the groove tracks is set by sampling and holding the focusing error signal immediately over the boundary. However, the target value of the focusing control is not necessarily limited to the value obtained by the above-described method. For example, in the case where the amount of the false difocus occurring on the land tracks and the groove tracks is a substantially constant value DF2, the false difocus value may be selectively applied as a target value to two constant voltage generators, instead of using the sampled and held focusing error signal value.

EXAMPLE 2

Figure 9:
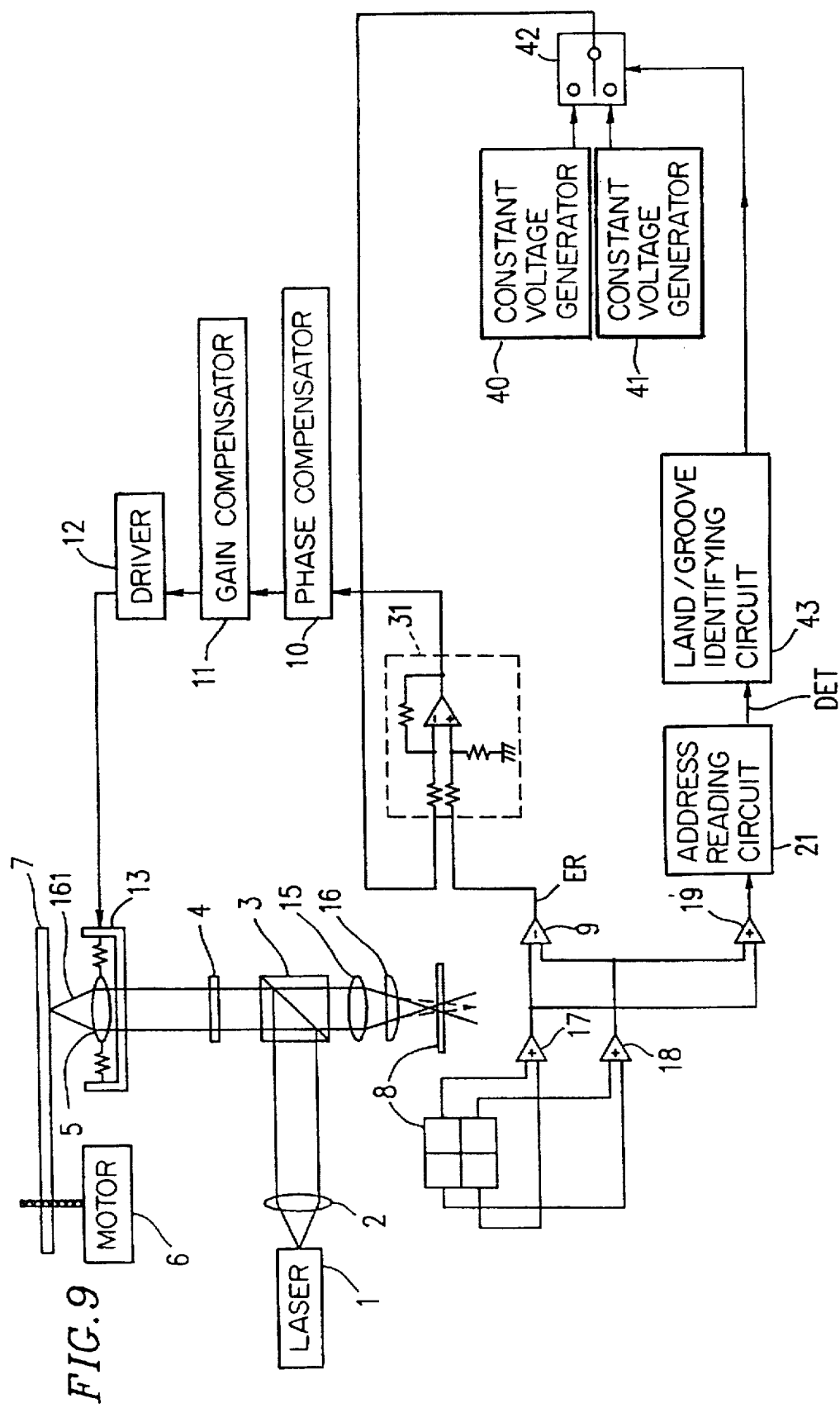
FIG. 9 is a block diagram of a focusing control apparatus according to a second example of the present invention.

FIG. 9 is a block diagram of a focusing control apparatus according to a second example of the present invention. With respect to FIG. 9, the same components as those in FIG. 1 will not be described again. Also, the disk to be used in this example is the same as the disk 7 used in the first example, so a view showing the structure thereof will not be described in this example in FIG. 9, constant voltage generators 40 and 41 output the target value of the focusing control on the land tracks and the groove tracks. The outputs of the constant voltage generators 40 and 41 are supplied to the two inputs of an analog switch 42. The analog switch 42 selectively outputs two input signals in response to the signal to the control terminal thereof. The output of the analog switch 42 is supplied to the inverting input of the differential amplifier 31 as the target value of the focusing control. When the control signal is at a HIGH level, the output of the constant voltage generator 40 is supplied to the inverting input of the differential amplifier 31. On the other hand, when the control signal is at a LOW level, the output of the constant voltage generator 41 is supplied to the inverting input of the differential amplifier 31. The constant voltage generator 40 outputs a signal at zero level. The constant voltage generator 41 outputs a difocus amount DP2 caused by the false difocus occurring on a land track.

The output DET of the address reading circuit 21 is input to a land/groove identifying circuit 43. The land/groove identifying circuit 43 determines whether the light beam is positioned on a land track or on a groove track based on the read address value. As described above, a plurality of groove tracks and land tracks are alternately arranged on the disk 7 for every rotation of the disk 7. An address portion is provided with a track address and a sector address. As a track address, a series of addresses in which integer values are sequentially assigned from an outer track to an inner track may be employed, for example. The land/groove identifying circuit 43 may determine easily whether the light beam 161 is positioned on a land track or on a groove track by identifying whether the read track address is an even number or an odd number. The output of the land/groove identifying circuit 43 is set at a HIGH level when the light beam 161 is positioned on a groove track, whereas the output is set at a LOW level when the light beam 161 is positioned on a land track. The output of the land/groove identifying circuit 43 is output to the control terminal of the analog switch 42. Accordingly, the output of the constant voltage generator 40 is supplied to the inverting input of the differential amplifier 31 as the target value of the focusing control when the light beam 161 is positioned on a groove track, and the output of the constant voltage generator 41 is supplied to the inverting input of the differential amplifier 31 as the target value of the focusing control when the light beam 161 is positioned on a land track. Therefore, in the same way as in Example 1, even in the case where the false difocus affects the focusing error signal, a focusing error signal corresponding to an in-focus position may be set as the target value of focusing control system. As a result, even if a false difocus is generated, a focusing control apparatus and a recording medium allowing for a focusing control without any errors may be realized. The levels of the output signals of the constant voltage generators 40 and 41 are not limited to zero and DF2, respectively. In the case where the focusing error signal is adjusted to be zero when the light beam 161 is positioned on the land track 171, the levels of the output signals of the constant voltage generators 40 and 41 may be DF2 and zero, respectively. In this example, by selectively switching the outputs of the two constant voltage generators, the target value of the focusing control is varied. However, the effects of the present invention are attained so long as the target value may be set at different levels. Thus a single voltage generator allowing for varying the output level may also be utilized. A method for producing the timings for switching the target value is the same as that of Example 1, so the description thereof will be omitted herein.

Figure 10:
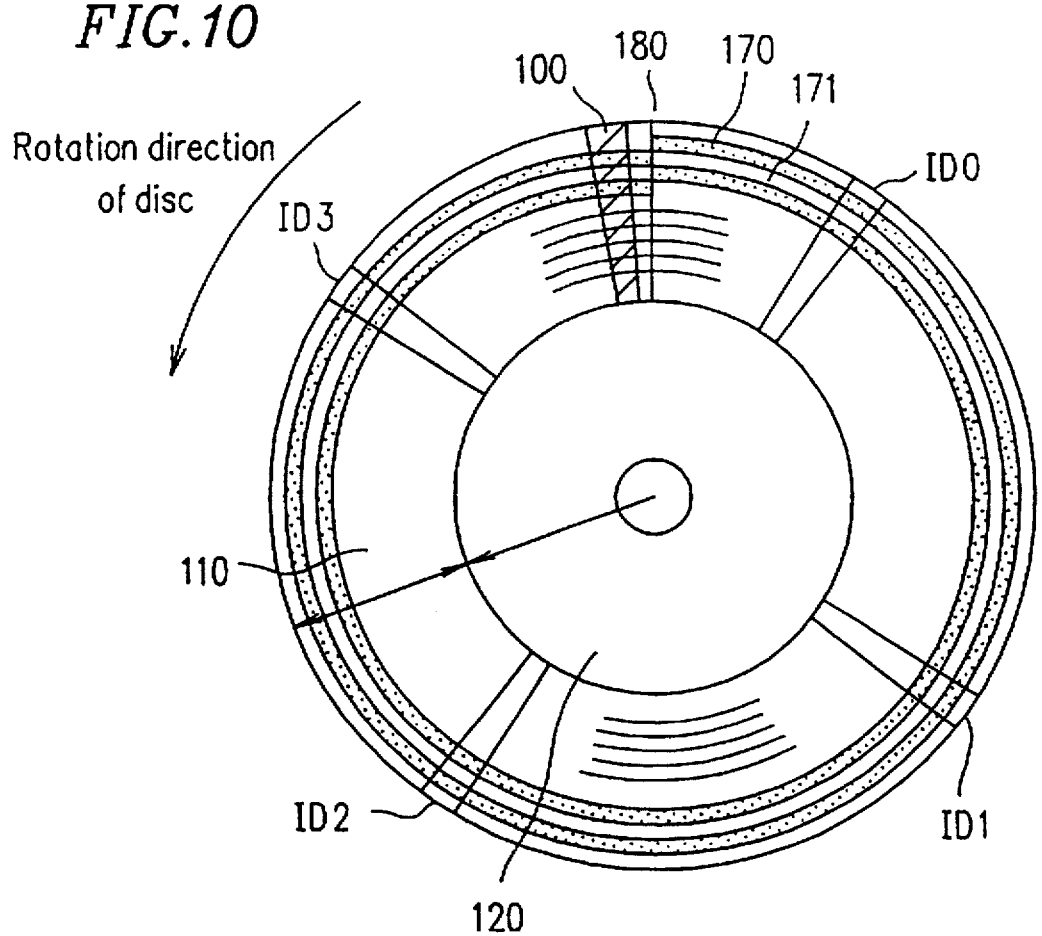
FIG. 10 is a plan view showing a disk having identifiers on the respective tracks instead of the address portions.

A method for determining the timings of sampling the focusing error signal is not limited to the above-mentioned method utilizing the addresses. FIG. 10 shows a disk having an identifier 100 for identifying a boundary 180 between a land track 171 and a groove track 170 (hereinafter, simply referred to as an "identifier" 100) on each track in place of an address portion. The identifier 100 shown in FIG. 10 is not necessarily required to include information about a track and a sector, but the identifier 100 may include such information. The identifier 100 has only to include a "unique mark" which the other data does not have in order to be distinguished from the other data. This condition is necessary for the identifier 100 to exist in a data region 110. The case where the identifier 100 exists in a non data region 120 will be described later. A "unique mark" means a mark which may univalently be distinguished from the other data recorded on the disk. In this example, a continuous sequence of bits, having a length longer than the maximal length of a continuous sequence of bits which a data other Than The identifier may take, is used as the unique mark. For example, it is assumed that the maximal number of continuous "1" bits which a data other than the identifier may take is 16. In this case, without consideration of possible bit errors, a bit sequence consisting of 17 continuous "1" bits may univalently be distinguished from the data other than the identifier 100, and therefore the identifier may be called a unique mark. In the same way as the above-described disk shown in FIG. 2, the identifier 100 exists "before" the boundary 180. Accordingly, the light beam 161 passes through the identifier 100 first, and then passes over the boundary 180.

In the disk shown in FIG. 10, it is also preferable that the distance between the identifier 100 and the boundary 180 is equal to the above-mentioned distance w. This is because the variation of the focusing error signal caused by the identifier is settled by the time period necessary for the light beam 161 to scan the distance between the identifier 100 and the boundary 180.

Figure 11:
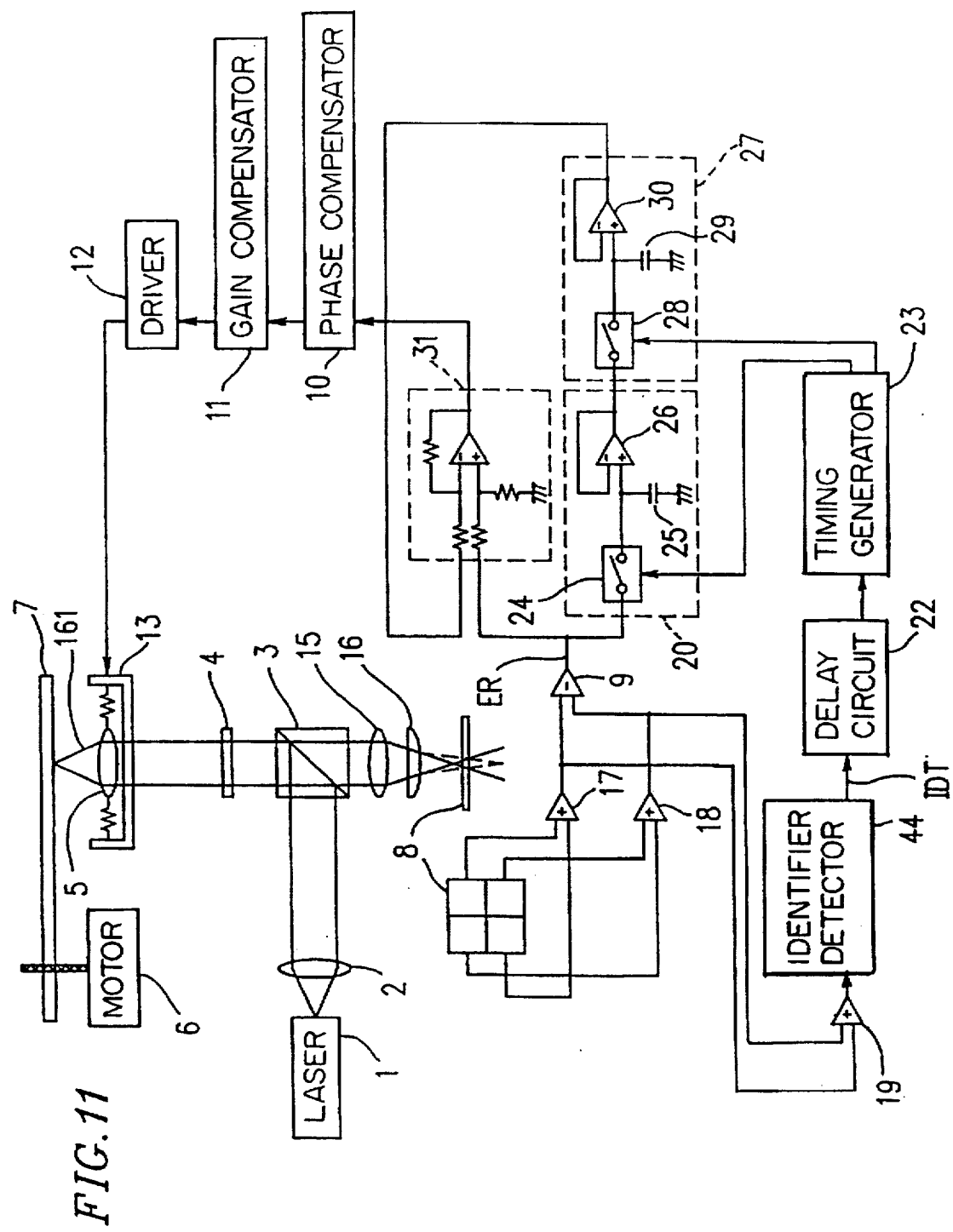
FIG. 11 is a block diagram of a focusing control apparatus used for the disk shown in FIG. 10.

FIG. 11 is a block diagram of a focusing control apparatus using the disk shown in FIG. 10. In the apparatus shown in FIG. 11, the output of the adder 19 is input to an identifier detector 44, not to the address reading circuit 21. The identifier detector 44 receives the output of the adder 19 so as to detect a continuous bit sequence having a length longer than a predetermined length, thereby identifying the existence of the identifier. When the identifier detector 44 identifies the existence of the identifier, the detector 44 supplies an identifier detection signal IDT to a timing generator 23 via a delay circuit 22. When the identifier detection signal IDT is input to the timing generator 23, the timing generator 23 outputs the two hold signals to the two sample and hold circuits 20 and 27 at respectively predetermined timings, in the same way as the example shown in FIG. 1. As a result, in the focusing control apparatus shown in FIG. 11, it is also possible to realize a focusing control without receiving any effect from the false difocus occurring on land tracks and groove tracks, in the same way as in the focusing control apparatus shown in FIG. 1. A delay time of the delay circuit 22 is determined in accordance with v and w as described in the first example, where v is the scanning linear velocity of the light beam 161 and w is a distance between the back end of the identifier 100 and the boundary 180.

Figure 12:
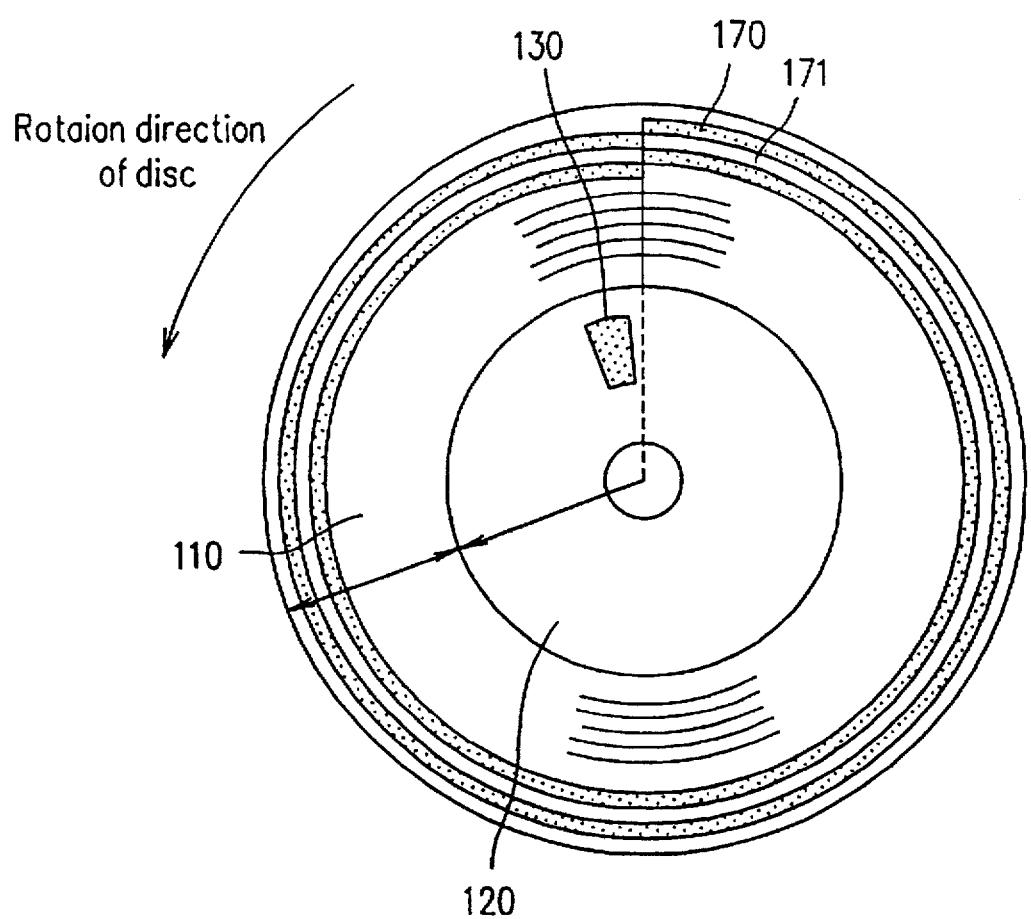
FIG. 12 is a plan view showing a disk provided with an identifier on a non data region.

FIG. 12 shows a disk in which an identifier 130 is provided in a region other than The data region for recording and reproducing the data (non data region 120). The identifier 130 of the disk shown in FIG. 12 is positioned in the non data region 120 existing on the inner side of the disk with respect to The data region 110. Accordingly, identifying the position of the boundary 180 while recording and reproducing the data requires a light beam, a detector, etc. for detecting the identifier 130 other Than The light beam, the detector, etc. for recording and reproducing the data. In the same way as in the disks shown in FIGS. 2 and 10, the identifier 130 exists before The boundary 180 with respect to the rotation direction of The disk. In the disk shown in FIG. 12, the identifier 130 does not occupy data region 110. Accordingly, it becomes possible to utilize the region occupied by the identifiers 100 of the disks shown in FIG. 10 as the data region 110 for recording and reproducing The data. As a result, the storage capacity of the disk may be increased. Since the identifier 130 of FIG. 12 is provided outside the data region 110, the identifier 130 is not required to be a a unique mark unlike the identifier 100 of the disk shown in FIG. 10. For example, if providing an area having a different reflectance from that of the data region 110, e.g., an area having a higher reflectance than that of the data region 110, then the area may function as an identifier 130.

Figure 13:
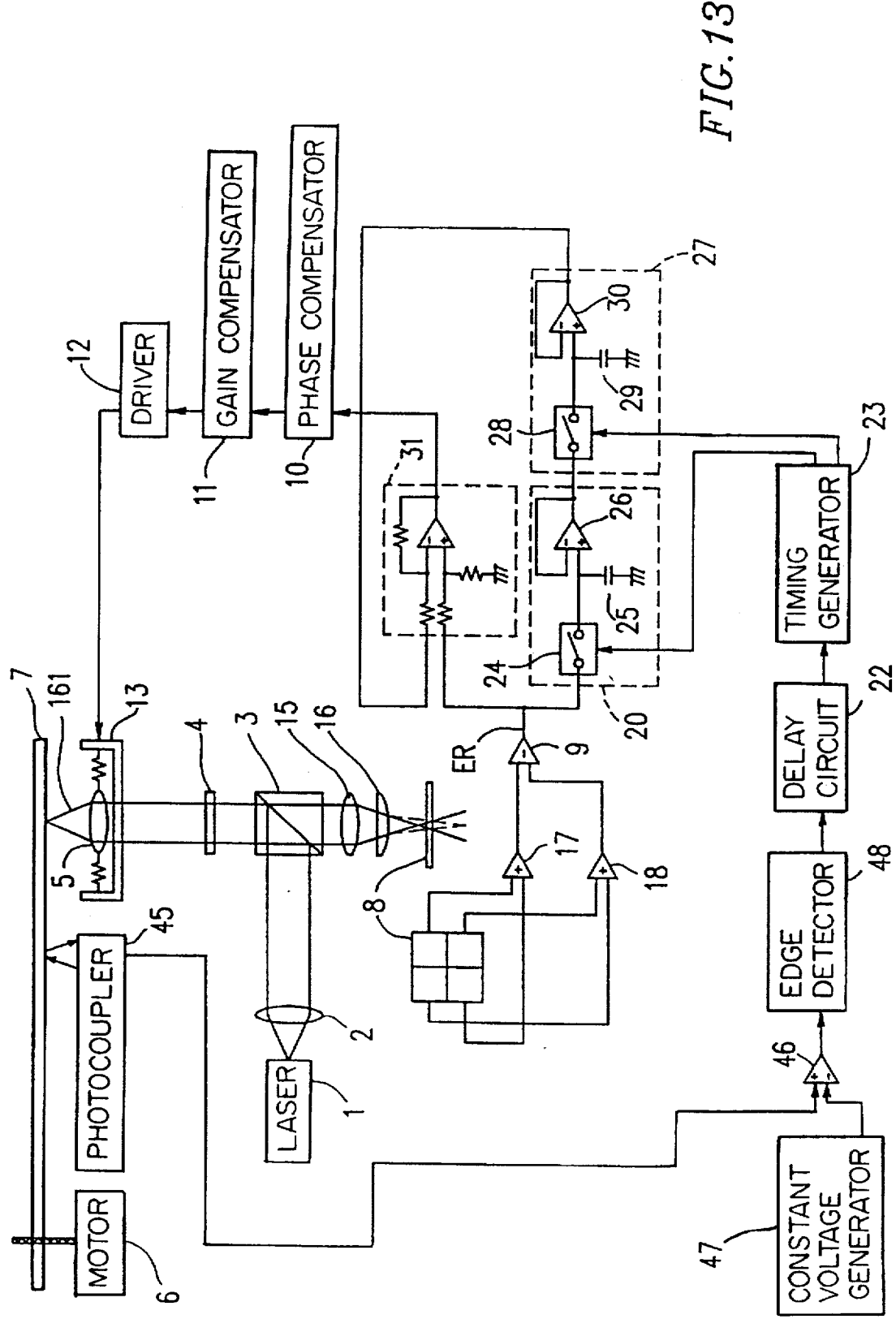
FIG. 13 is a block diagram of a focusing control apparatus used for the disk shown in FIG. 12.

FIG. 13 is a block diagram of a focusing control apparatus used for the disk shown in FIG. 12. In the focusing control apparatus shown in FIG. 13, a photocoupler 45 detects the identifier 130. The photocoupler 45 includes a light-emitting portion and a light-receiving portion (not shown). The light beam 161 emitted from the light-emitting portion is irradiated on the non data region of the disk 7, and the light-receiving portion receives the light beam 161 reflected by the disk 7. The output of the photocoupler 45 is supplied to the non-inverting input of the differential circuit 46. A predetermined voltage output from the constant voltage generator 47 is supplied to the inverting input of the differential circuit 46 as a comparison signal. The differential circuit 46 compares the two input signals, thereby supplying a signal of HIGH level to the input of an edge detector 48 when the output of the photocoupler 45 is larger than the predetermined voltage. On the other hand, when the output of the photocoupler 45 is smaller than the predetermined voltage, the differential circuit 46 supplies a signal of LOW level to the input of the edge detector 48. The edge detector 48 detects a rising edge of the output from the differential circuit 46. As mentioned above, the reflectance of the identifier 130 is, for example, higher than the reflectance of the other region. Accordingly, the identifier 130 may be detected by the focusing control apparatus shown in FIG. 13. The output of the edge detector 48 is supplied to the input of the timing generator 23 via the delay circuit 22. When the edge detection signal output from the edge detector 48 is input to the timing generator 23, the timing generator 23 outputs the two hold signals to the two sample and hold circuits 20 and 27 at respectively predetermined timings as described referring to FIG. 1. Accordingly, a focusing control without receiving any effect from the false difocus may also be realized by the focusing control apparatus of FIG. 13 in the same way as the focusing control apparatus of FIG. 1.

If the information about the distance between the identifier 130 and the boundary 180 is recorded in the identifier 130, then the distance between the identifier 130 and the boundary 180 may be detected at the same time as the reading of the identifier 130. Based on the distance and the scanning linear velocity of the light beam 161, the time period necessary for the light beam 161 to scan the distance between the identifier 130 and the boundary 180 may be detected in accordance with this time period, the timings of the sampling may be determined. As a result, even in the case where the light beam 161 does not scan at a constant velocity, the timing information may be obtained at real time and the structure of the focusing control apparatus itself may be simplified. Such a method is applicable not only to a disk having an identifier, but also to a disk having an address portion. That is to say, by recording the information about the distance w between the address portion and the boundary, it is also possible to obtain the information for calculating the sampling timings. Also, the identifier may include the address information, e.g., information about a track address and a sector address.

The address portion or the identifier (in the following description, the identifier will be adopted as a representative) for determining the sampling timings, which has been described in detail above, is preferably positioned before the "vicinity" of the boundary. For convenience, the angle of the rotation of the disk during a time period necessary for the light beam 161 to pass through the identifier and over the boundary will be called a "difference angle" herein. The position before "the vicinity" herein means that the "difference angle" is small. The reason why it is preferable for the identifier to exist before the vicinity is that too large a difference angle causes shift or errors in the timing for sampling the target values owing to errors of the rotation angle velocity of the disk. An actual difference angle is preferably smaller than 0.2 to 0.5 rad.

Figure 14:
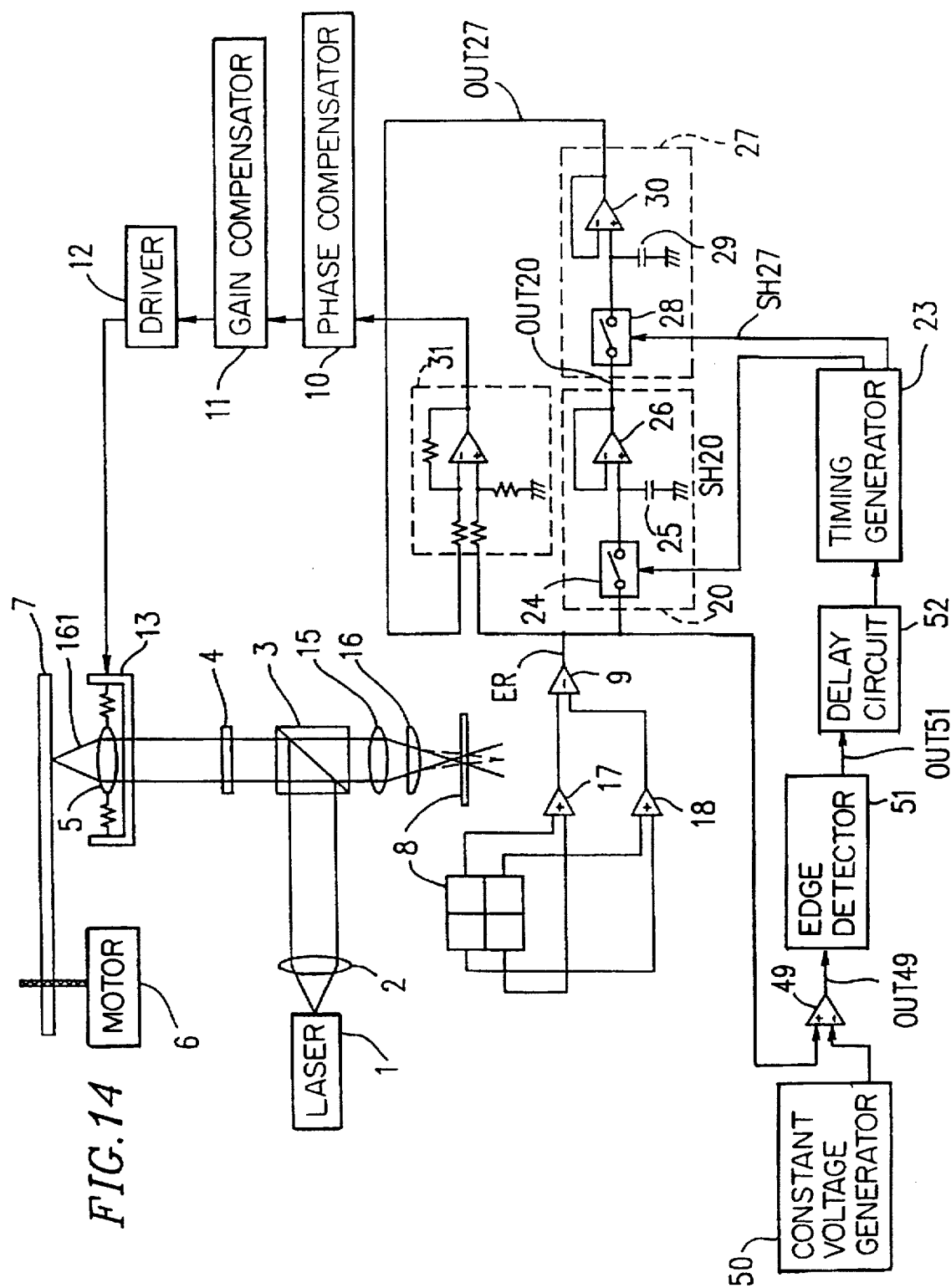
FIG. 14 is a block diagram of a focusing control apparatus where the identifiers are not used.
Figure 16A:
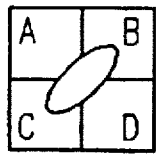
FIGS. 16A to 16E are views showing the respective shapes of the light beam irradiated on the four division photodetectors in accordance with the variation of the distance between the focal point of the light beam and the disk.
Figure 16B:
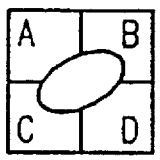
Figure 16C:
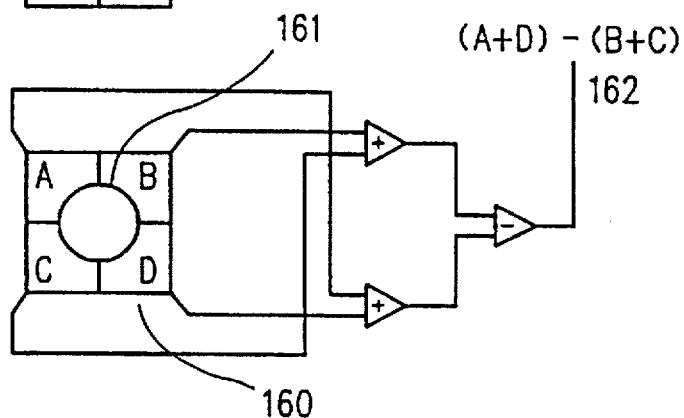
Figure 16D:
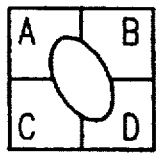
Figure 16E:
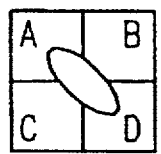
Figure 17:
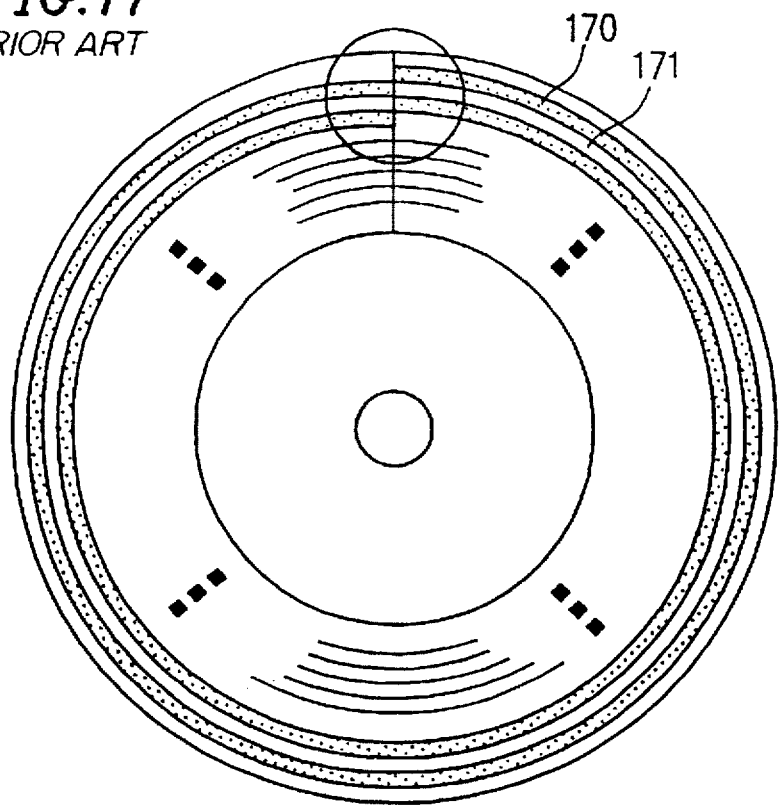
FIG. 17 is a plan view schematically showing an L/G disk.
Figure 18:
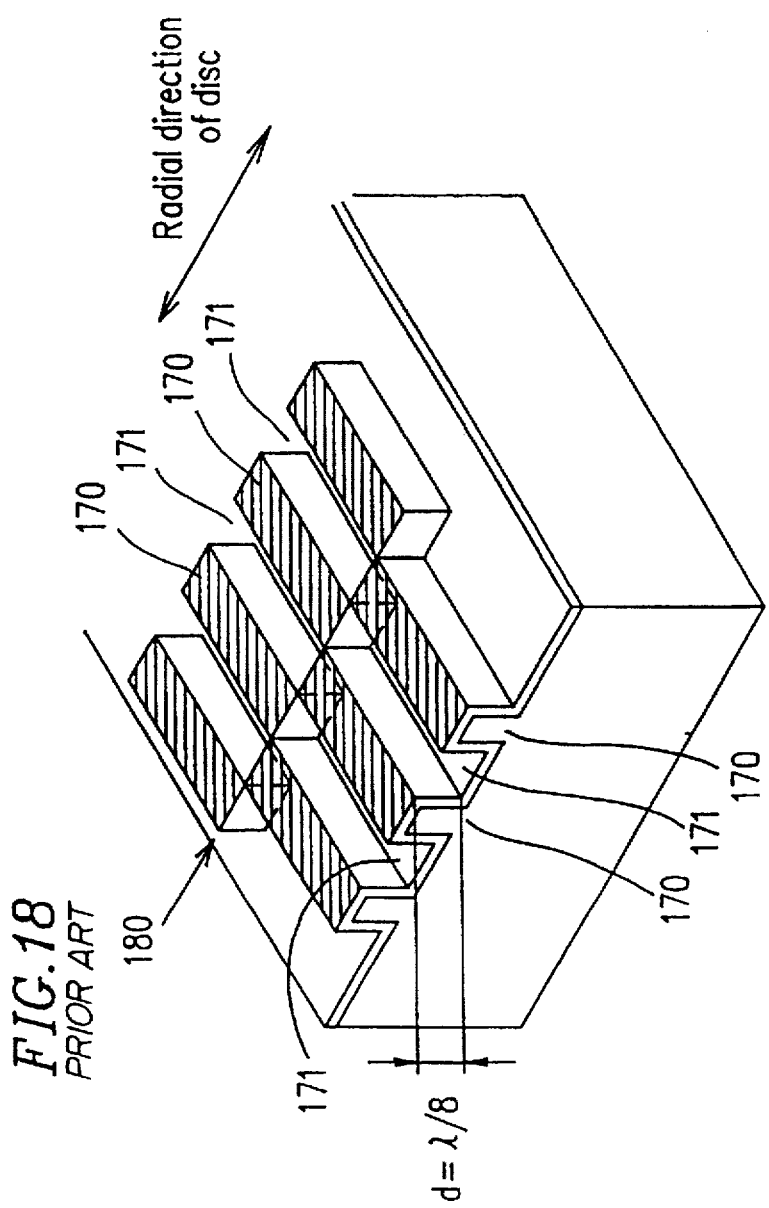
FIG. 18 is an enlarged perspective view of the encircled portion of FIG. 17 showing the boundary between a land track and a groove track in a radial direction.
Figure 19A:
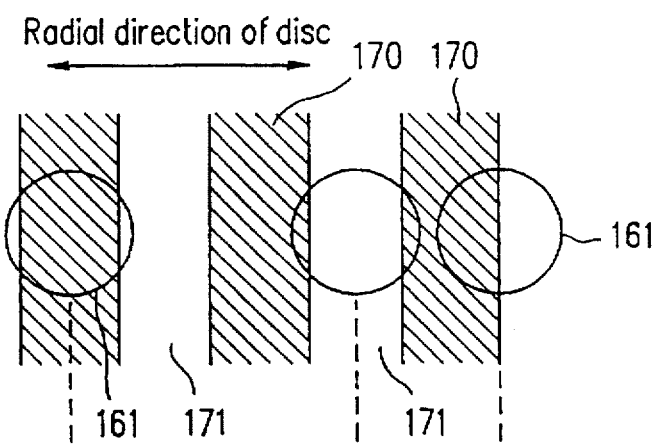
FIGS. 19A to 19C illustrate the variations of the focusing error signal and the tracking error signal during the passage of the light beam on the tracks in a radial direction of the disk.
Figure 19B:
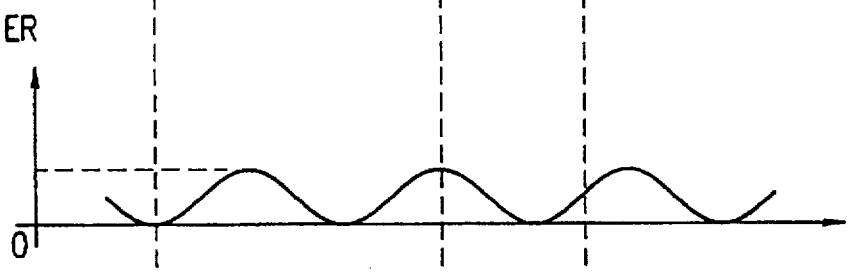
Figure 19C:
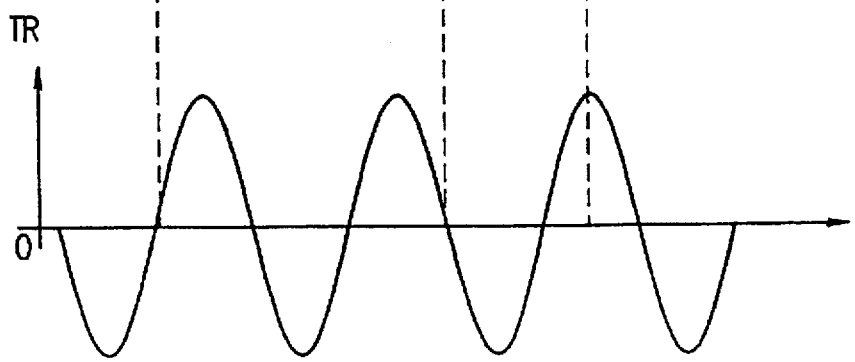

In the foregoing examples, the boundary between a land track and a groove track was detected by using the address portion or the identifier. Hereinafter, a focusing control apparatus for realizing a focusing control without using an identifier will be described. FIG. 14 is a block diagram of a focusing control apparatus of the invention in which an identifier is not used. In the focusing control apparatus shown in FIG. 14, the boundary is detected by checking the variation of the focusing error signal itself. To realize such a detection, the focusing error signal ER output from the differential circuit 9 is also supplied to the non-inverting input of the differential circuit 49. A predetermined voltage output from a constant voltage generator 50 is supplied to the inverting input of the differential circuit 49 as a comparison signal. The differential circuit 49 compares these two inputs so as to output a signal of HIGH level when the level of focusing error signal is larger than the predetermined voltage. On the other hand, when the level of focusing error signal is smaller than the predetermined voltage, the differential circuit 49 outputs a signal of LOW level. The level of the comparison signal output from the constant voltage generator 50 will be described later. The signal OUT49 output from the differential circuit 49 is also supplied to the input of the timing generator 23 via the edge detector 51 and the delay circuit 52. The edge detector 51 is a detector for detecting both edges. If either a rising edge or a falling edge is detected in the input signal thereto, the edge detector 51 outputs an edge detection signal OUT51. When the edge detection signal OUT51 delayed by the delay circuit 52 is input to the timing generator 23, the timing generator 23 outputs the two hold signals SH20 and SH27 to the two sample and hold circuits 20 and 27 at respectively predetermined timings, as described referring to FIG. 1.

FIGS. 15A to 15H show the respective positions of the light beam 161 and the waveforms of the respective positions in order to illustrate the operation of the focusing control apparatus of FIG. 14. FIG. 15A shows the passage of the light beam 161 through the respective tracks when the light beam 161 scans the tracks as the disk 7 rotates. First, the light beam 161 is positioned on a groove track 170; next, the light beam 161 passes over the boundary 180 between a land track 171 and the groove track 170 so as to reach the land track 171; then, after one rotation around the disk, the light beam 161 passes over the boundary 180 again so as to reach another groove track 170. In FIGS. 15B, 15C, 15D, 15E, 15F, 15G, and 15H, the axes of ordinates indicate the respective levels of the focusing error signal ER; the output OUT49 of the differential circuit 49; the output OUT51 of the edge detector 51; a hold signal SH20 supplied to the sample and hold circuit 20; a hold signal SH27 supplied to the sample and hold circuit 27; the output OUT20 of the sample and hold circuit 20; and the output OUT27 of the sample and hold circuit 27. The axes of abscissas in FIGS. 15B to 15H are indicated so as to correspond to the axis of abscissas of FIG. 15A, i.e., the positions of the light beam 161 on the tracks.

In the description referring to FIGS. 15A to 15H, for simplification, it is assumed that the difocus is not generated on the groove track 170, i.e., the light beam on the groove track 170 is in focus, and that the focusing error signal ER is at the zero level on the groove track 170. The levels of the hold signals SH20 and SH27 output from the timing generator 23 are set at a LOW level and a HIGH level, respectively. In this case, since the switch 24 of the sample and hold circuit 20 is closed, the sample and hold circuit 20 outputs a signal equal to the input signal. The switch 28 of the sample and hold circuit 27 is open, so that the sample and hold circuit 27 outputs a voltage held in a capacitor 29.

When the light beam 161 reaches the boundary 180, the level of the focusing error signal ER becomes the difocus amount DF owing to the false difocus as mentioned above. As shown in FIG. 15B, the constant voltage generator 50 applies a voltage at a level substantially a half of DF to the inverting input of the differential circuit 49 as a comparison signal OUT50. Accordingly, at the time T11 when the light beam 161 reaches the boundary, the output OUT49 of the differential circuit 49 is varied from a LOW level to a HIGH level. The edge detector 51 detects this rising edge so as to output She edge detection signal 0UT51 to the delay circuit 52. The edge detection signal detected at the time T11 when the light beam 161 passes over the boundary is input via the delay circuit 52 to the timing generator 23 at the time T12. The delay time DU of the delay circuit 52 is set to be a time period from the time when the light beam 161 passes over the boundary 180 till the time when the entire light beam 161 is positioned on the land track 171. When the timing generator 23 receives the edge detection signal OUT51 at the time T12, the timing generator 23 sets the hold signal SH20 at a HIGH level and the hold signal SH27 at a LOW level during a time period HT1, as described referring to FIG. 1. The following operation is the same as those of the foregoing examples, so the detailed description thereof will be omitted herein. In this case, it is also possible to eliminate the effect of the false difocus from the focusing control.

After another rotation of the disk, the light beam 161 passes from the land track 171 to another groove track 170 at the time T15. The positions of the four-division photodetectors 8 are adjusted with respect to the light beam 161 so that the focusing error signal ER is zero on the groove track 170. Accordingly, the level of the focusing error signal ER becomes zero. As a result, the output 49 of the differential circuit 49 is varied from the HIGH level to the LOW level. The edge detector 51 detects the falling edge so as to output the edge detection signal OUT51. Thereafter, in the same way, from the time T16 later than the time T15 by the delay time DU, the hold signal SH20 is set at the HIGH level during a time period HT1 and the hold signal SH27 is set at the LOW level during a time period HT2. The detail description of the following operation will be omitted herein, however, it is also possible to eliminate the effects of the false difocus from the focusing control. The level of the comparison signal is not limited to DF/2. If the differential circuit 49 has hysterisis characteristics, it is possible to remove spike noise of the focusing error signal ER occurring when the light beam 161 passes over the boundary 180.

In the foregoing examples, the present invention has been described as being applied to a disk on which a plurality of land tracks and groove tracks are alternately arranged and connected in series. However, the present invention is applicable to a disk in which a false difocus is generated in recording and reproduction, even if the disk is not provided with an alternate arrangement of the land tracks and groove tracks which are connected in series. For example, the present invention is applicable to a disk where there is no boundary for every rotation of the disk; a single land track and a single groove track are spirally formed; and the information is recorded and reproduced on/from both of the land track and the groove track. Such a disk scans the tracks, for example, by scanning the groove track from the outermost portion to the innermost portion and then scanning the land track from the outermost portion to the innermost portion. Therefore, in this case, it is also possible to eliminate the effects of the false difocus from the focusing control.

According to a focusing control apparatus of the present invention, the target value of the focusing control is varied in accordance with the positions of the light beam, i.e.; whether the light beam is positioned on a land track or on a groove track. Therefore, even if the level of the focusing error signal is varied owing to the false difocus, it is possible to eliminate the effects of the difocus from the focusing control. Consequently, in an optical disk where information is recorded and reproduced on/from a land track and a groove track, it is also possible to realize a focusing control of high precision.

According to a focusing control apparatus of the present invention, the variation of the focusing error signal is detected, and the focusing error signal is sampled based on the detected timings. As a result, it is not necessary to record the information about the sampling timings on a recording medium itself. Consequently, not only the increase in the memory capacity of an optical disk but also the simplification of the focusing control apparatus may be realized.

According to a recording medium of the present invention, the sampling timings of the focusing error signal may be determined based on the identifiers recorded on the recording medium. Therefore, before the focusing control system is affected by the false difocus, it is possible to sample an appropriate focusing error signal. Consequently, a focusing control of high precision may be realized.

According to a recording medium of the present invention, a predetermined distance is provided between an identifier and a boundary, so that a focusing error signal may be sampled after the variation of the focusing error signal owing to the effects of the identifier disappears. Consequently, a focusing control of high precision may be realized.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A focusing control apparatus for controlling a light beam so as to focus the light beam on a recording medium on which a spiral track comprising land track portions and groove track portions, both of the portions including recording and reproducing information, is provided, comprising:

a focusing means for focusing the light beam on the recording medium;

a focusing state detection means for detecting a focusing state of the light beam on the recording medium so as to provide an output indicating the focusing state;

a control means for maintaining the focusing state of the light beam on the recording medium by moving the focusing means based on a comparison between the output from the focusing state detection means and a target value; and a target value setting means for setting the target value at a first level when the light beam is irradiated on the land track portions, and for setting the target value at a second level, different from the first level, when the light beam is irradiated on the groove track portions.

2. A focusing control apparatus according to claim 1, wherein the land track portions and the groove track portions are alternately arranged and connected in series so as to form the spiral track.

3. A focusing control apparatus according to claim 1, wherein the target value setting means switches the target value between the first level and the second level, when the output from the focusing state detection means is varied by a predetermined value or more.

4. A focusing control apparatus according to claim 1, wherein the target value setting means switches the target value between the first level and the second level in response to a signal generated by an identifier recorded on the recording medium.

5. A focusing control apparatus according to claim 4, wherein the target value setting means switches the target value between the first level and the second level after a predetermined time period has passed from a time when the target value setting means receives the signal generated by the identifier.

6. A focusing control apparatus according to claim 1, wherein the target value setting means switches the target value between the first level and the second level in response to a signal generated by an address pit provided on the recording medium.

7. A focusing control apparatus according to claim 6, wherein the target value setting means switches the target value between the first level and the second level after a predetermined time period has passed from a time when the target value setting means receives the signal generated by the address pit.

8. A focusing control apparatus according to claim 7, wherein the predetermined time period is determined based on information recorded by the address pit.

9. A focusing control apparatus according to claim 1, wherein the target value setting means comprises a sampling means for sampling the output from the focusing state detection means, and at least one of the first level and the second level is set based on a sampled value of the output from the focusing state detection means.

10. A focusing control apparatus according to claim 9, wherein the sampling means samples the output from the focusing state detection means within a predetermined time period from a time when the light beam passes in a circumferential direction over a boundary between each of the land track portions and each of the groove track portions.

11. A focusing control apparatus according to claim 10, wherein the predetermined time period is shorter than a response time period of the control means.

12. A focusing control apparatus according to claim 11, wherein the sampling means samples the output from the focusing state detection means in response to a signal generated by an address pit provided on the recording medium, and wherein a time period DT from a time when the light beam passes through the address pit to a time when the output from the focusing state detection means is sampled is more than w/v, where v is a scanning linear velocity of the light beam on a track portion on which the light beam is irradiated, and w is a circumferential distance between the address pit and the boundary.

13. A focusing control apparatus according to claim 12, wherein the circumferential distance w between the address pit and the boundary is determined based on address information generated by the address pit provided on the recording medium.

14. A focusing control apparatus according to claim 11, wherein the sampling means samples the output from the focusing state detection means after a predetermined time period has passed from a time when the target value setting means receives a signal generated by an identifier recorded on the recording medium.

15. A focusing control apparatus according to claim 14, wherein the predetermined time is approximately equal to (w/v), where v is a scanning linear velocity of the light beam on a track portion on which the light beam is irradiated, and w is a circumferential distance between the identifier and the boundary.

* * * * *